US009279364B2

(12) United States Patent
Hamrin et al.

(10) Patent No.: US 9,279,364 B2
(45) Date of Patent: Mar. 8, 2016

(54) MULTI-COMBUSTOR TURBINE

(75) Inventors: Douglas Hamrin, Laguna Niguel, CA (US); Steve Lampe, Westlake Village, CA (US)

(73) Assignee: Ener-Core Power, Inc., Irvine, CA (US)

(*) Notice: Subject to any disclaimer, the term of this patent is extended or adjusted under 35 U.S.C. 154(b) by 1066 days.

(21) Appl. No.: 13/289,996

(22) Filed: Nov. 4, 2011

(65) Prior Publication Data

US 2013/0111913 A1    May 9, 2013

(51) Int. Cl.
| | |
|---|---|
| *F02C 7/08* | (2006.01) |
| *F02C 3/22* | (2006.01) |
| *F02C 7/224* | (2006.01) |
| *F23L 15/04* | (2006.01) |
| *F23C 6/04* | (2006.01) |
| *F23R 3/34* | (2006.01) |
| *F23R 3/36* | (2006.01) |
| *F23C 99/00* | (2006.01) |

(52) U.S. Cl.
CPC ... *F02C 3/22* (2013.01); *F02C 7/08* (2013.01); *F02C 7/224* (2013.01); *F23C 6/042* (2013.01); *F23C 99/006* (2013.01); *F23L 15/04* (2013.01); *F23R 3/346* (2013.01); *F23R 3/36* (2013.01); *F05D 2220/75* (2013.01); *F23C 2900/99001* (2013.01); *F23C 2900/99006* (2013.01); *F23D 2900/21003* (2013.01); *F23R 2900/00002* (2013.01); *F23R 2900/03341* (2013.01); *Y02E 20/342* (2013.01)

(58) Field of Classification Search
CPC .............. F02C 7/10; F02C 7/08; F02C 9/28; F02C 6/02; F24J 1/00
See application file for complete search history.

(56) References Cited

U.S. PATENT DOCUMENTS

| | | | |
|---|---|---|---|
| 2,303,381 | A | 12/1942 | New |
| 2,433,932 | A | 1/1948 | Stosick |
| 2,443,841 | A | 6/1948 | Sweeney |
| 2,624,172 | A | 1/1953 | Houdry |
| 2,630,678 | A | 3/1953 | Pratt |
| 2,655,786 | A | 10/1953 | Carr |

(Continued)

FOREIGN PATENT DOCUMENTS

| | | |
|---|---|---|
| CH | 319366 A | 2/1957 |
| GB | 2080934 A | 2/1982 |

(Continued)

OTHER PUBLICATIONS

"Flameless Thermal Oxidizers" <http://www.selasfluid.com/international/web/le/us/likelesfus.nsf/docbyalias/flameless_thermal>, Copyright 2008, 3 pages, retrieved May 13, 2010.

(Continued)

*Primary Examiner* — Gerald L Sung
(74) *Attorney, Agent, or Firm* — McDermott Will & Emery LLP

(57) ABSTRACT

A system for the gradual oxidation of fuel is disclosed. The system includes an oxidizer that has a reaction chamber with an inlet and an outlet. The reaction chamber is configured to receive a fluid comprising an oxidizable fuel through the inlet. The oxidizer is configured to maintain a flameless oxidation process. The system also includes a heating chamber with an inlet and an outlet. The inlet of the heating chamber is in fluid communication with the outlet of the reaction chamber. The heating chamber is configured to receive the fluid from the reaction chamber and selectably heat the fluid.

27 Claims, 14 Drawing Sheets

(56) References Cited

U.S. PATENT DOCUMENTS

| | | |
|---|---|---|
| 2,793,497 A | 5/1957 | Hellmuth |
| 2,795,054 A | 6/1957 | Bowen, III |
| 3,313,103 A | 4/1967 | Johnson |
| 3,661,497 A | 5/1972 | Castellucci et al. |
| 3,731,485 A | 5/1973 | Rudolph et al. |
| 3,732,911 A | 5/1973 | Lowe et al. |
| 3,769,922 A | 11/1973 | Furlong et al. |
| 3,790,350 A | 2/1974 | Haensel |
| 3,797,231 A | 3/1974 | McLean |
| 3,810,732 A | 5/1974 | Koch |
| 3,846,979 A | 11/1974 | Pfefferle |
| 3,928,961 A | 12/1975 | Pfefferle |
| 3,942,264 A | 3/1976 | Zenkner |
| 3,943,705 A | 3/1976 | DeCorso et al. |
| 3,975,900 A | 8/1976 | Pfefferle |
| 4,052,143 A | 10/1977 | Sandviknes |
| 4,111,644 A | 9/1978 | Buckholdt |
| 4,116,005 A | 9/1978 | Willyoung |
| 4,125,359 A | 11/1978 | Lempa |
| 4,163,366 A | 8/1979 | Kent |
| 4,168,950 A | 9/1979 | Seemann et al. |
| 4,187,672 A | 2/1980 | Rasor |
| 4,192,642 A | 3/1980 | Lempa |
| 4,202,168 A | 5/1980 | Acheson et al. |
| 4,202,169 A | 5/1980 | Acheson et al. |
| 4,209,303 A | 6/1980 | Ricks |
| 4,221,558 A | 9/1980 | Santisi |
| 4,239,481 A | 12/1980 | Morck, Jr. |
| 4,252,070 A | 2/1981 | Benedick |
| 4,289,475 A | 9/1981 | Wall et al. |
| 4,321,790 A | 3/1982 | Vadas et al. |
| 4,361,478 A | 11/1982 | Gengler et al. |
| 4,379,689 A | 4/1983 | Morck, Jr. |
| 4,400,356 A | 8/1983 | McVay et al. |
| 4,403,941 A | 9/1983 | Okiura et al. |
| 4,416,620 A | 11/1983 | Morck |
| 4,418,530 A | 12/1983 | Bodrov et al. |
| 4,442,901 A | 4/1984 | Zison |
| 4,447,690 A | 5/1984 | Grever |
| 4,449,918 A | 5/1984 | Spahr |
| 4,467,610 A | 8/1984 | Pearson et al. |
| 4,469,176 A | 9/1984 | Zison et al. |
| 4,472,935 A | 9/1984 | Acheson et al. |
| 4,487,573 A | 12/1984 | Gottschlich et al. |
| 4,493,770 A | 1/1985 | Moilliet |
| 4,509,333 A | 4/1985 | Nussdorfer et al. |
| 4,509,374 A | 4/1985 | Sugimoto et al. |
| 4,534,165 A | 8/1985 | Davis, Jr. et al. |
| 4,643,667 A | 2/1987 | Fleming |
| 4,646,660 A | 3/1987 | Bjorkman et al. |
| 4,681,612 A | 7/1987 | O'Brien et al. |
| 4,688,495 A | 8/1987 | Galloway |
| 4,731,989 A | 3/1988 | Furuya et al. |
| 4,733,528 A | 3/1988 | Pinto |
| 4,741,690 A | 5/1988 | Heed |
| 4,754,607 A | 7/1988 | Mackay |
| 4,769,149 A | 9/1988 | Nobilet et al. |
| 4,779,545 A | 10/1988 | Breen et al. |
| 4,794,753 A | 1/1989 | Beebe |
| 4,823,711 A | 4/1989 | Kroneberger et al. |
| 4,828,481 A | 5/1989 | Weil et al. |
| 4,838,020 A | 6/1989 | Fujitsuka |
| 4,838,782 A | 6/1989 | Wills |
| 4,841,722 A | 6/1989 | Bjorge |
| 4,850,857 A | 7/1989 | Obermuller |
| 4,864,811 A | 9/1989 | Pfefferle |
| 4,870,824 A | 10/1989 | Young et al. |
| 4,874,310 A | 10/1989 | Seemann et al. |
| 4,888,162 A | 12/1989 | Brian |
| 4,941,415 A | 7/1990 | Pope et al. |
| 4,953,512 A | 9/1990 | Italiano |
| 4,974,530 A | 12/1990 | Lyon |
| 5,000,004 A | 3/1991 | Yamanaka et al. |
| 5,003,773 A | 4/1991 | Beckwith |
| 5,044,931 A | 9/1991 | Van Eerden et al. |
| 5,059,405 A | 10/1991 | Watson et al. |
| 5,108,717 A | 4/1992 | Deller et al. |
| 5,131,838 A | 7/1992 | Gensler et al. |
| 5,154,599 A | 10/1992 | Wunning |
| 5,161,366 A | 11/1992 | Beebe |
| 5,165,884 A | 11/1992 | Martin et al. |
| 5,183,401 A | 2/1993 | Dalla Betta et al. |
| 5,190,453 A | 3/1993 | Le et al. |
| 5,225,575 A | 7/1993 | Ivanov et al. |
| 5,232,357 A | 8/1993 | Dalla Betta et al. |
| 5,248,251 A | 9/1993 | Dalla Betta et al. |
| 5,250,489 A | 10/1993 | Dalla Betta et al. |
| 5,258,349 A | 11/1993 | Dalla Betta et al. |
| 5,259,754 A | 11/1993 | Dalla Betta et al. |
| 5,263,314 A | 11/1993 | Anderson |
| 5,271,729 A | 12/1993 | Gensler et al. |
| 5,271,809 A | 12/1993 | Holzhausen |
| 5,281,128 A | 1/1994 | Dalla Betta et al. |
| 5,285,123 A | 2/1994 | Kataoka et al. |
| 5,309,707 A | 5/1994 | Provol et al. |
| 5,320,518 A | 6/1994 | Stilger et al. |
| 5,326,253 A | 7/1994 | Dalla Betta et al. |
| 5,326,537 A | 7/1994 | Cleary |
| 5,329,757 A | 7/1994 | Faulkner et al. |
| 5,329,955 A | 7/1994 | Gensler et al. |
| 5,384,051 A | 1/1995 | McGinness |
| 5,405,260 A | 4/1995 | Della Betta et al. |
| 5,406,704 A | 4/1995 | Retallick |
| 5,425,632 A | 6/1995 | Tsurumi et al. |
| 5,461,864 A | 10/1995 | Betta et al. |
| 5,506,363 A | 4/1996 | Grate et al. |
| 5,511,972 A | 4/1996 | Dalla Betta et al. |
| 5,512,250 A | 4/1996 | Betta et al. |
| 5,518,697 A | 5/1996 | Dalla Betta et al. |
| 5,524,432 A | 6/1996 | Hansel |
| 5,524,599 A | 6/1996 | Kong et al. |
| 5,533,890 A | 7/1996 | Holst et al. |
| 5,557,014 A | 9/1996 | Grate et al. |
| 5,560,128 A | 10/1996 | Marega et al. |
| 5,592,811 A | 1/1997 | Dodge et al. |
| 5,601,790 A | 2/1997 | Stilger et al. |
| 5,602,298 A | 2/1997 | Levin |
| 5,635,139 A | 6/1997 | Holst et al. |
| 5,637,283 A | 6/1997 | Stilger et al. |
| 5,650,128 A | 7/1997 | Holst et al. |
| 5,685,156 A | 11/1997 | Willis et al. |
| 5,697,776 A | 12/1997 | Van Eerden et al. |
| 5,709,541 A | 1/1998 | Gensler et al. |
| 5,729,967 A | 3/1998 | Joos et al. |
| 5,770,584 A | 6/1998 | Kucera et al. |
| 5,770,784 A | 6/1998 | Heywood et al. |
| 5,806,298 A | 9/1998 | Klosek et al. |
| 5,816,705 A | 10/1998 | Vander Heyden et al. |
| 5,817,286 A | 10/1998 | Martin et al. |
| 5,819,524 A | 10/1998 | Bosley et al. |
| 5,819,673 A | 10/1998 | Heywood et al. |
| 5,832,713 A | 11/1998 | Maese et al. |
| 5,842,357 A | 12/1998 | Siwajek et al. |
| 5,850,731 A | 12/1998 | Beebe et al. |
| 5,850,733 A | 12/1998 | Bosley et al. |
| 5,857,419 A | 1/1999 | Van Eerden et al. |
| 5,862,858 A | 1/1999 | Wellington et al. |
| 5,895,599 A | 4/1999 | Nivoche |
| 5,896,740 A | 4/1999 | Shouman |
| 5,921,763 A | 7/1999 | Martin |
| 5,944,503 A | 8/1999 | Van Eerden et al. |
| 5,987,875 A | 11/1999 | Hilburn et al. |
| 6,000,930 A | 12/1999 | Kelly et al. |
| 6,015,540 A | 1/2000 | McAdams et al. |
| 6,017,172 A | 1/2000 | Ukegawa et al. |
| 6,019,172 A | 2/2000 | Wellington et al. |
| 6,033,207 A | 3/2000 | Cummings |
| 6,053,699 A | 4/2000 | Turnquist et al. |
| 6,070,404 A | 6/2000 | Bosley et al. |
| 6,071,114 A | 6/2000 | Cusack et al. |
| 6,095,793 A | 8/2000 | Greeb |
| 6,098,396 A * | 8/2000 | Wen et al. .......... 60/777 |
| 6,107,693 A | 8/2000 | Mongia et al. |
| 6,109,018 A | 8/2000 | Rostrup-Nielsen et al. |

(56) References Cited

U.S. PATENT DOCUMENTS

| | | |
|---|---|---|
| 6,116,014 A | 9/2000 | Dalla Betta et al. |
| 6,126,913 A | 10/2000 | Martin et al. |
| 6,136,144 A | 10/2000 | Martin et al. |
| 6,141,953 A | 11/2000 | Mongia et al. |
| 6,158,222 A | 12/2000 | Retallick |
| 6,164,908 A | 12/2000 | Nishida et al. |
| 6,205,768 B1 | 3/2001 | Dibble et al. |
| 6,217,832 B1 | 4/2001 | Betta et al. |
| 6,226,976 B1 | 5/2001 | Scott et al. |
| 6,251,347 B1 | 6/2001 | Campbell et al. |
| 6,257,869 B1 | 7/2001 | Martin et al. |
| 6,261,093 B1 | 7/2001 | Matros et al. |
| 6,269,625 B1 | 8/2001 | Dibble et al. |
| 6,269,882 B1 | 8/2001 | Wellington et al. |
| 6,313,544 B1 | 11/2001 | Mongia et al. |
| 6,334,769 B1 | 1/2002 | Retallick et al. |
| 6,339,924 B1 | 1/2002 | Hoyer et al. |
| 6,339,925 B1 | 1/2002 | Hung et al. |
| 6,345,495 B1 | 2/2002 | Cummings |
| 6,391,267 B1 | 5/2002 | Martin et al. |
| 6,393,727 B1 | 5/2002 | Seelig et al. |
| 6,393,821 B1 | 5/2002 | Prabhu |
| 6,469,181 B1 | 10/2002 | Gruber et al. |
| 6,485,289 B1 | 11/2002 | Kelly et al. |
| 6,487,860 B2 | 12/2002 | Mayersky et al. |
| 6,497,615 B1 | 12/2002 | Klager |
| 6,514,472 B2 | 2/2003 | Menacherry et al. |
| 6,521,566 B1 | 2/2003 | Magno et al. |
| 6,539,720 B2 | 4/2003 | Rouse et al. |
| 6,551,068 B2 | 4/2003 | Blotenberg |
| 6,595,001 B2 | 7/2003 | Rautenbach et al. |
| 6,595,003 B2 | 7/2003 | Dalla Betta et al. |
| 6,612,112 B2 | 9/2003 | Gilbreth et al. |
| 6,634,176 B2 | 10/2003 | Rouse et al. |
| 6,639,328 B2 | 10/2003 | Wacknov |
| 6,641,625 B1 | 11/2003 | Clawson et al. |
| 6,655,137 B1 | 12/2003 | Sardari |
| 6,657,332 B2 | 12/2003 | Balas |
| 6,657,348 B2 | 12/2003 | Qin et al. |
| 6,675,583 B2 | 1/2004 | Willis et al. |
| 6,696,130 B1 | 2/2004 | Kasai et al. |
| 6,698,412 B2 | 3/2004 | Dalla Betta |
| 6,715,295 B2 | 4/2004 | Gadde et al. |
| 6,715,296 B2 | 4/2004 | Bakran et al. |
| 6,718,772 B2 | 4/2004 | Dalla Betta et al. |
| 6,720,685 B2 | 4/2004 | Balas |
| 6,732,531 B2 | 5/2004 | Dickey |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,784,565 B2 | 8/2004 | Wall et al. |
| 6,787,933 B2 | 9/2004 | Claude et al. |
| 6,796,129 B2 | 9/2004 | Yee et al. |
| 6,796,789 B1 | 9/2004 | Gibson et al. |
| 6,804,946 B2 | 10/2004 | Willis et al. |
| 6,810,678 B1 | 11/2004 | Luk |
| 6,812,586 B2 | 11/2004 | Wacknov et al. |
| 6,812,587 B2 | 11/2004 | Gilbreth et al. |
| 6,815,932 B2 | 11/2004 | Wall |
| 6,824,328 B1 | 11/2004 | Vinegar et al. |
| 6,832,480 B1 | 12/2004 | Anguil |
| 6,864,595 B2 | 3/2005 | Wall |
| 6,892,542 B2 | 5/2005 | Voinov |
| 6,895,760 B2 | 5/2005 | Kesseli |
| RE38,784 E | 8/2005 | Maese et al. |
| 6,923,001 B2 | 8/2005 | Laster et al. |
| RE38,815 E | 10/2005 | Maese et al. |
| 6,951,110 B2 | 10/2005 | Kang |
| 6,960,840 B2 | 11/2005 | Willis et al. |
| 6,962,055 B2 | 11/2005 | Chen et al. |
| 6,983,605 B1 | 1/2006 | Hook et al. |
| 7,007,486 B2 | 3/2006 | Sprouse et al. |
| 7,007,487 B2 | 3/2006 | Belokon et al. |
| 7,017,329 B2 | 3/2006 | Farhangi et al. |
| 7,045,913 B2 | 5/2006 | Ebrahim et al. |
| 7,053,590 B2 | 5/2006 | Wang |
| 7,062,917 B2 | 6/2006 | Wunning et al. |
| 7,093,445 B2 | 8/2006 | Corr, II et al. |
| 7,096,671 B2 | 8/2006 | Bland et al. |
| 7,117,676 B2 | 10/2006 | Farhangi et al. |
| 7,117,694 B2 | 10/2006 | Braun et al. |
| 7,121,097 B2 | 10/2006 | Yee et al. |
| 7,124,589 B2 | 10/2006 | Neary |
| 7,140,188 B2 | 11/2006 | Hosokawa et al. |
| 7,168,949 B2 | 1/2007 | Zinn et al. |
| RE39,596 E | 5/2007 | Dodge et al. |
| 7,353,655 B2 | 4/2008 | Bolis et al. |
| 7,378,065 B2 | 5/2008 | Filippi et al. |
| 7,425,127 B2 | 9/2008 | Zinn et al. |
| 7,430,869 B2 | 10/2008 | Su et al. |
| 7,469,647 B2 | 12/2008 | Widmer et al. |
| 7,624,564 B2 | 12/2009 | Stuttaford et al. |
| 7,703,271 B2 | 4/2010 | Minkkinen et al. |
| 2002/0015670 A1 | 2/2002 | Shah et al. |
| 2002/0060556 A1 | 5/2002 | Wall |
| 2002/0063479 A1 | 5/2002 | Mitchell et al. |
| 2002/0066270 A1 | 6/2002 | Rouse et al. |
| 2002/0067872 A1 | 6/2002 | Weissert |
| 2002/0069648 A1 | 6/2002 | Levy et al. |
| 2002/0078694 A1 | 6/2002 | Nazeer et al. |
| 2002/0079760 A1 | 6/2002 | Vessa |
| 2002/0084702 A1 | 7/2002 | Balas |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0104316 A1 | 8/2002 | Dickey et al. |
| 2002/0125779 A1 | 9/2002 | Qin et al. |
| 2002/0128076 A1 | 9/2002 | Lubell |
| 2002/0166324 A1 | 11/2002 | Willis et al. |
| 2002/0195031 A1 | 12/2002 | Walker |
| 2003/0102730 A1 | 6/2003 | Balas |
| 2003/0110773 A1 | 6/2003 | Rouse et al. |
| 2003/0111842 A1 | 6/2003 | Gilbreth et al. |
| 2003/0157395 A1 | 8/2003 | Ren et al. |
| 2003/0192318 A1 | 10/2003 | Sprouse et al. |
| 2003/0192319 A1 | 10/2003 | Sprouse et al. |
| 2004/0003598 A1 | 1/2004 | Farhangi |
| 2004/0011523 A1 | 1/2004 | Sarada |
| 2004/0021235 A1 | 2/2004 | Corr et al. |
| 2004/0040312 A1 | 3/2004 | Hoffjann et al. |
| 2004/0074223 A1 | 4/2004 | Willis et al. |
| 2004/0100101 A1 | 5/2004 | Willis et al. |
| 2004/0103669 A1 | 6/2004 | Willis et al. |
| 2004/0119291 A1 | 6/2004 | Hamrin et al. |
| 2004/0129188 A1 | 7/2004 | Traina |
| 2004/0148942 A1 | 8/2004 | Pont et al. |
| 2004/0160061 A1 | 8/2004 | Rouse et al. |
| 2004/0167270 A1 | 8/2004 | Chang et al. |
| 2004/0178641 A1 | 9/2004 | Wall |
| 2004/0206090 A1 | 10/2004 | Yee et al. |
| 2004/0219079 A1 | 11/2004 | Hagen et al. |
| 2004/0238654 A1 | 12/2004 | Hagen et al. |
| 2004/0255588 A1 | 12/2004 | Lundberg et al. |
| 2005/0022499 A1 | 2/2005 | Belokon et al. |
| 2005/0028530 A1 | 2/2005 | Doebbeling et al. |
| 2005/0076648 A1 | 4/2005 | Farhangi |
| 2005/0196714 A1 | 9/2005 | Carroni et al. |
| 2005/0201909 A1 | 9/2005 | Carroni et al. |
| 2005/0217178 A1 | 10/2005 | Aoyama |
| 2006/0016195 A1 | 1/2006 | Dalla Betta et al. |
| 2006/0037432 A1 | 2/2006 | Deevi et al. |
| 2006/0049080 A1 | 3/2006 | Bacha et al. |
| 2006/0052499 A1 | 3/2006 | Chang et al. |
| 2006/0054318 A1 | 3/2006 | Sarada |
| 2006/0063845 A1 | 3/2006 | O'Rear et al. |
| 2006/0063869 A1 | 3/2006 | Chang et al. |
| 2006/0063870 A1 | 3/2006 | Chang et al. |
| 2006/0074134 A1 | 4/2006 | O'Rear et al. |
| 2006/0080968 A1 | 4/2006 | Griffin et al. |
| 2006/0096294 A1 | 5/2006 | Farhangi et al. |
| 2006/0096297 A1 | 5/2006 | Griffin et al. |
| 2006/0138022 A1 | 6/2006 | Miller et al. |
| 2006/0138024 A1 | 6/2006 | Miller et al. |
| 2006/0150635 A1 | 7/2006 | Su et al. |

(56) References Cited

U.S. PATENT DOCUMENTS

| | | |
|---|---|---|
| 2006/0196807 A1 | 9/2006 | Rosenbaum et al. |
| 2006/0199743 A1 | 9/2006 | Rosenbaum et al. |
| 2006/0202059 A1 | 9/2006 | Carroni et al. |
| 2006/0213183 A1 | 9/2006 | Althaus |
| 2006/0260308 A1 | 11/2006 | Ingersoll |
| 2006/0272331 A1 | 12/2006 | Bucker et al. |
| 2007/0054226 A1 | 3/2007 | Carroni et al. |
| 2007/0240425 A1 | 10/2007 | Malavasi et al. |
| 2008/0222913 A1 | 9/2008 | Ronning et al. |
| 2008/0256938 A1 | 10/2008 | Miretti |
| 2009/0100820 A1 | 4/2009 | Prabhu |
| 2009/0100821 A1 | 4/2009 | Prabhu |
| 2009/0136406 A1 | 5/2009 | Johnson et al. |
| 2009/0272097 A1 | 11/2009 | Lawson et al. |
| 2010/0139282 A1 | 6/2010 | Prabhu |
| 2010/0233642 A1 | 9/2010 | Mozzi et al. |
| 2010/0275611 A1 | 11/2010 | Prabhu |
| 2010/0319355 A1 | 12/2010 | Prabhu |
| 2011/0067407 A1 | 3/2011 | Berdou et al. |
| 2011/0212010 A1 | 9/2011 | Bell |
| 2011/0219780 A1 | 9/2011 | Prabhu |
| 2012/0141343 A1 | 6/2012 | Shiban |
| 2012/0167552 A1 | 7/2012 | Mori et al. |
| 2013/0104563 A1 | 5/2013 | Oelfke et al. |
| 2013/0111920 A1 | 5/2013 | Hamrin et al. |
| 2013/0232874 A1 | 9/2013 | Maslov |
| 2013/0232876 A1 | 9/2013 | Armstrong et al. |
| 2013/0232939 A1 | 9/2013 | Armstrong et al. |
| 2013/0232940 A1 | 9/2013 | Armstrong |
| 2013/0232942 A1 | 9/2013 | Watts |
| 2013/0232943 A1 | 9/2013 | Lampe et al. |
| 2013/0232944 A1 | 9/2013 | Lampe et al. |
| 2013/0232945 A1 | 9/2013 | Armstrong et al. |
| 2013/0232946 A1 | 9/2013 | Hamrin et al. |
| 2013/0232947 A1 | 9/2013 | Armstrong et al. |
| 2013/0232982 A1 | 9/2013 | Maslov |
| 2013/0232983 A1 | 9/2013 | Maslov |
| 2013/0232984 A1 | 9/2013 | Lampe et al. |
| 2013/0232985 A1 | 9/2013 | Hamrin et al. |
| 2013/0233213 A1 | 9/2013 | Martin et al. |
| 2013/0236369 A1 | 9/2013 | Maslov et al. |
| 2013/0236370 A1 | 9/2013 | Maslov |
| 2013/0236371 A1 | 9/2013 | Maslov |
| 2013/0236372 A1 | 9/2013 | Denison et al. |
| 2013/0236839 A1 | 9/2013 | Lampe et al. |
| 2013/0236841 A1 | 9/2013 | Armstron. et al. |
| 2013/0236845 A1 | 9/2013 | Hamrin et al. |

FOREIGN PATENT DOCUMENTS

| | | |
|---|---|---|
| JP | 11-13483 A | 1/1999 |
| JP | 2003-536364 | 2/2003 |
| WO | WO-92/20963 A1 | 11/1992 |
| WO | WO-96/14370 A2 | 5/1996 |
| WO | WO-01/92702 A1 | 12/2001 |

OTHER PUBLICATIONS

Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.

Wünning, "Flameless Combustion and its Applications," <http://www.bine.info/fileadmin/content/Publikationen/Projekt-Infos/Zusatzinfos/2006-07_Flameless_Combustion.pdf>, Jul. 2007.

Gutmark, Abstract Submitted for the DFD06 Meeting of the American Physical Society, Electronic form version 1.4, <http://absimage.aps.org/image/DFD06/MWS_DFD06-2006-000152.pdf>, Jul. 26, 2006.

* cited by examiner

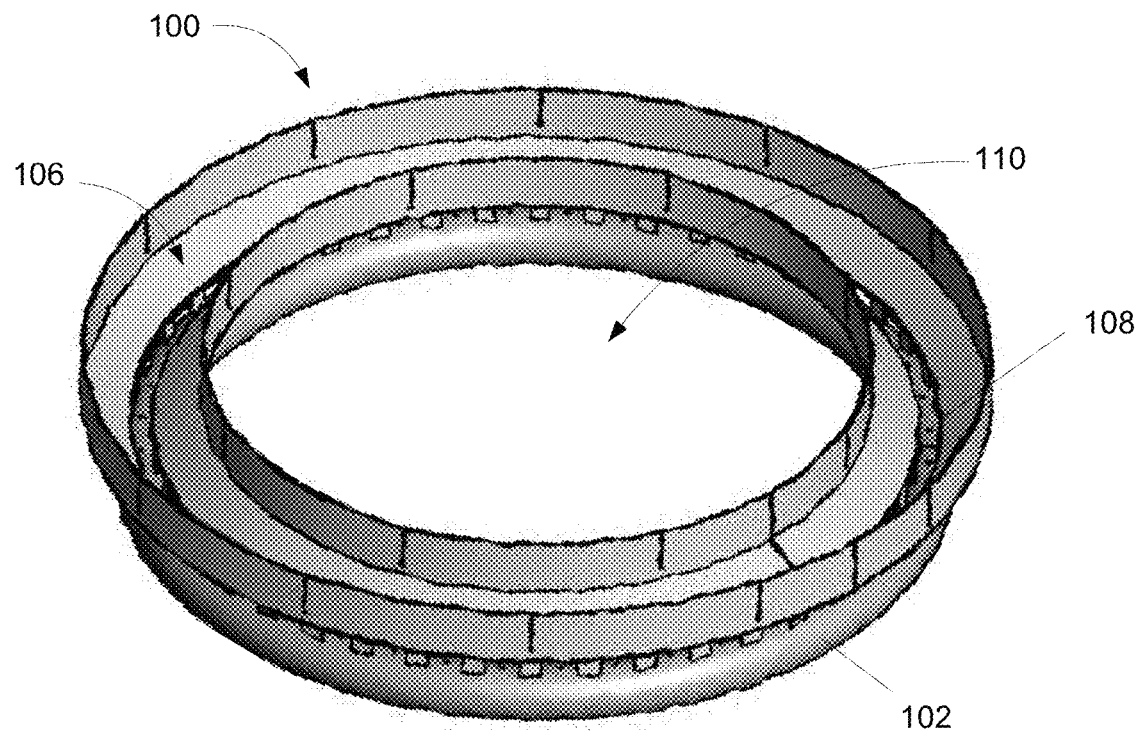
FIG. 7A
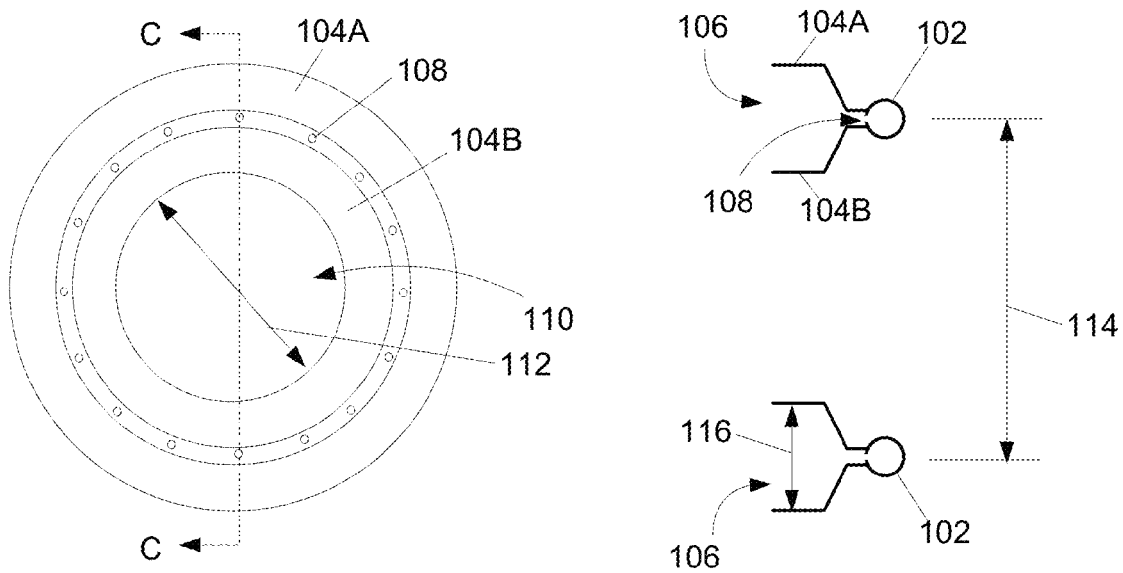
FIG. 7B
FIG. 7C

| | |
|---|---|
| 810 | flow rate of fuel gas 52 |
| 820 | generated power |
| 830 | inlet temperature of warmer 62 |
| 840 | inlet temperature of oxidizer 60 |
| 850 | inlet temperature of combustor 64 |
| 860 | inlet temperature of turbine 66 |
| 870 | outlet temperature of turbine 66 |
| (reference indicators refer to FIG. 2) | |

MULTI-COMBUSTOR TURBINE

BACKGROUND

1. Field

The present disclosure generally relates to systems and methods of operating a gas turbine and, particularly, operating a gas turbine from a low-energy content fuel.

2. Description of the Related Art

In a conventional gas turbine system, a high-energy-content fuel, for example propane, is combusted as it is injected into pressurized air, thereby heating and increasing the thermal energy of the gas. The energy is then extracted from the heated gas with a turbine which converts thermal energy into kinetic energy. The kinetic energy may be used to drive another device, for example an electric power generator. The combustion process is often initiated by an ignition source, for example a spark plug. Due to the high energy content of the fuel, the combustion is very rapid and nearly instantaneous.

SUMMARY

One of the drawbacks of existing gas turbine systems is that they require a high-energy-content fuel, such as propane ($C_3H_8$) that can sustain a continuous flame. It is desirable for a gas turbine to operate off of low-energy-content fuel, such as the methane ($CH_4$) that evolves from some landfills, with an exhaust that minimizes undesirable components such as carbon monoxide (CO) and various nitrogen oxides. $NO_x$ is a generic term for the mono-nitrogen oxides NO and $NO_2$ (nitric oxide and nitrogen dioxide). To accomplish this operation, the gas reaches a temperature that is high enough to convert all volatile organic compounds (VOCs) in the incoming fuel/air mixture to carbon dioxide ($CO_2$) and water ($H_2O$) and eliminate CO, while keeping the maximum gas temperature below the temperatures at which $NO_x$ will form.

The disclosed turbine system uses a gradual oxidizer (also referred to herein as an oxidizer, a gradual oxidation chamber, an oxidation reaction chamber) in place of a combustion chamber to generate the heat that drives the process. The oxidizer can contain material, such as a ceramic, that is structured to be porous to a gas flow and retains its structure at temperatures above 1200 degrees Fahrenheit (F).

In some embodiments, the gradual oxidizer has a very large thermal inertia and is brought up to the operating temperature of 1000-1200° F. before the gradual oxidation process will occur. Therefore, the turbine system can be started under an alternate energy source, and when the oxidizer has been correctly heated, the system can transition from an operation using the alternate energy source to an operation using the gradual oxidation process. In certain embodiments, a combustor is used to start the turbine. Some embodiments provide that heat from the turbine exhaust warms incoming gas through a heat exchanger, but it may not be sufficient to warm the oxidizer to a temperature that will support a gradual oxidation process. In certain embodiments, a warmer is used to heat incoming air at an inlet of the oxidizer in order to raise the temperature of the oxidation chamber to a desired operational temperature range.

In certain embodiments a system for gradually oxidizing fuel is disclosed. The system comprises an oxidizer having a reaction chamber with an inlet and an outlet. The reaction chamber is configured to receive a gas comprising an oxidizable fuel through the inlet. The oxidizer is configured to maintain a flameless oxidation process. The system also comprises a first heating chamber with an inlet and an outlet. The inlet is in fluid communication with the outlet of the reaction chamber. The first heating chamber is configured to receive the gas from the reaction chamber and selectably heat the gas.

In some embodiments, the system further includes a turbine having an inlet and an outlet, the inlet of the turbine coupled to the outlet of the first heating chamber, the turbine configured to receive the gas from the first heating chamber. The system can further include, in certain embodiments, a compressor coupled to the inlet of the reaction chamber and further coupled to the turbine, the compressor configured to be driven by the turbine to compress the gas prior to the gas being received by the reaction chamber.

In some embodiments, the system includes a second heating chamber coupled between the compressor and the inlet of the reaction chamber, the second heating chamber being configured to receive the compressed gas from the compressor and to selectably heat the gas prior to the gas being received by the reaction chamber. Some embodiments provide that the system further includes a heat exchanger comprising a first portion coupled between the compressor and the second heating chamber such that the gas from the compressor passes through the second portion before it is received by the second heating chamber and a second portion coupled to the outlet of the turbine such that the gas from the turbine passes through the second portion, the heat exchanger configured to thermally couple the gas in the second portion to the gas in the first portion.

In some embodiments, the oxidizer includes a porous media disposed within the reaction chamber. The oxidizer can further include, in certain embodiments, at least one anchor heater that is at least partially disposed within the reaction chamber. Certain embodiments provide that the oxidizer does not comprise a catalyst for the oxidation process.

The oxidizer preferably is further configured to maintain the oxidation process when the fuel content of the gas is below a level that will sustain a continuous flame. In some embodiments, the oxidizer is further configured to maintain the oxidation process when the gas comprises less than 5% oxidizable fuel. In some embodiments, the oxidizer is further configured to maintain the oxidation process when the oxidizable fuel is methane.

In certain embodiments, the first heating chamber includes a burner configured to receive and ignite a combustible fuel-air mixture. Some embodiments provide that the second heating chamber comprises a burner configured to selectably accept and ignite a combustible fuel-air mixture. In some embodiments, the system further includes a power generator coupled to the turbine, the power generator configured to be driven by the turbine. Some embodiments provide that the gas comprises at least one volatile organic compound (VOC); and the oxidizer achieves at least partial oxidation of the VOC.

In certain embodiments, a gradual oxidation system is disclosed. The system comprises a compressor configured to receive and compress a gas comprising a fuel-air mixture. The system also comprises a warmer coupled to the compressor. The warmer is configured to receive the gas from the compressor and to selectably heat the gas. The system also comprises a reaction chamber coupled to the warmer. The reaction chamber is configured to receive the gas from the warmer and maintain a flameless oxidation process of the fuel-air mixture without a catalyst. The system also comprises a heater coupled to the reaction chamber. The heater is configured to receive the gas from the reaction chamber and selectably heat the gas. The system also comprises a turbine coupled to the heater and further coupled to the compressor. The turbine is configured to receive the gas from the heater and expand the gas to drive the compressor.

In some embodiments, the system includes a controller coupled to the warmer and the heater, the controller configured to control the heating of the gas in the warmer and in the heater. In some embodiments, the controller is coupled to a first sensor that measures a first temperature of the gas at the outlet of the reaction chamber, the controller further configured to cause the warmer to heat the gas until the first temperature reaches a first setpoint.

Some embodiments provide that the controller is coupled to a second sensor that measures a second temperature of the gas at the inlet of the turbine, the controller is further configured to cause an adjustment in the fuel provided to the oxidizer until the second temperature reaches a second setpoint. In some embodiments, the system further includes a power generator coupled to the turbine and the controller, wherein the turbine is further configured to drive the power generator and the controller is further configured to control the power generator to maintain the turbine speed within a range.

In certain embodiments, a method of gradual oxidation is disclosed. The method includes the steps of compressing a gas comprising a mixture of air and an oxidizable fuel, heating the compressed gas to a first temperature that exceeds an auto-ignition temperature of the fuel, and maintaining the gas above the first temperature for at least a first period of time sufficient to accomplish at least a desired degree of oxidation of the fuel, thereby forming an oxidized gas, e.g., a gas comprising the products of oxidation of at least a portion of the oxidizable fuel in the original gas/air mixture.

In some methods, the step of compressing the gas is accomplished using a compressor; and the method further comprises the steps of (i) expanding the oxidized gas using a turbine; and (ii) driving the compressor with the turbine. Some methods further include the step of heating the oxidized gas to at least a second temperature. In some methods, the step of heating the compressed gas comprises passing the compressed gas through a first portion of a heat exchanger and the oxidized gas through a second portion of the heat exchanger such that heat is transferred from the oxidized gas to the compressed gas.

In some methods, the step of heating the compressed gas comprises passing the compressed gas through a warmer configured to heat the compressed gas. Some methods provide that the step of maintaining the gas above the first temperature comprises maintaining the gas below a third temperature.

The details of one or more embodiments of these concepts are set forth in the accompanying drawings and the description below. Other features, objects, and advantages of these concepts will be apparent from the description and drawings, and from the claims.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 7A is a perspective view of an exemplary burner according to certain aspects of this disclosure.

FIG. 7B is a front view of the burner of FIG. 7A according to certain aspects of this disclosure.

FIG. 7C is a cross-section of the burner of FIG. 7A according to certain aspects of this disclosure.

DETAILED DESCRIPTION

The following description discloses embodiments of a system for oxidation of a fluid that comprises an oxidizable fuel. In certain embodiments, the system includes a turbine combustor that can be used to start up the system and a warmer combustor that can be used to warm up an oxidizer, or oxidation chamber, to a temperature at or near the auto-ignition temperature of the fuel in the fluid. The system is particularly adapted for utilization of a fluid with a low energy content, such as a methane content below 5%, in a sustainable gradual oxidation process to drive a turbine that further drives a power generator as well as driving a compressor in the system. In certain embodiments, the system also reduces undesirable components, such as CO and $NO_x$, in the exhaust that is vented to the atmosphere.

In the following detailed description, numerous specific details are set forth to provide an understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The method and system disclosed herein are presented in terms of a turbine system that drives a power generator using a methane-containing gas as a fuel gas and a commercially pure gas, such as methane or propane, as an auxiliary gas. Nothing in this disclosure should be interpreted, unless specifically stated as such, to limit the application of any method or system disclosed herein to a particular fuel gas or auxiliary gas or a turbine system of this particular configuration. Other configurations of turbine-compressor systems are known to those of skill in the art and the application of the components and principles disclosed herein to other systems will be apparent.

Figure 1:
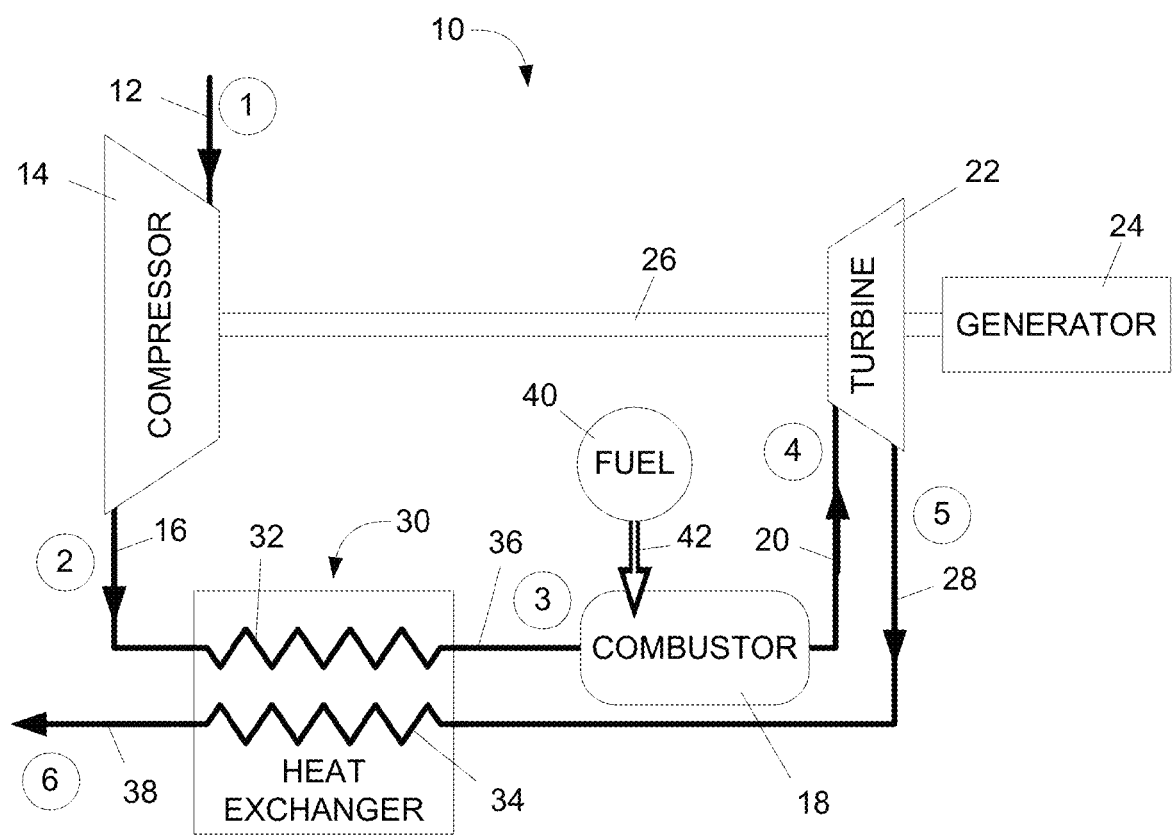
FIG. 1 is a schematic diagram of an example existing gas turbine system.

FIG. 1 is a schematic diagram of an example gas turbine system 10. In this system, air at state 1, discussed in greater detail below, is drawn into compressor 14 through the inlet line 12. The compressor 14 raises the pressure and temperature of the air to state 2 in line 16. As the gas leaving the turbine 22 is hotter than the gas leaving the compressor 14, it is possible to heat up the air before it enters the combustion chamber 18 using a heat exchanger 30. This results in lower fuel consumption in the combustion chamber 18 to produce the same temperature of the gas at the turbine inlet line 20 and makes the system 10 more efficient.

The compressed air flows through the incoming side 32 of the heat exchanger 30 which raises the temperature of the gas to state 3 in line 36. The compressed air enters the combustion chamber 18 where a high-energy content fuel 40, such as propane or natural gas, is injected and ignited within the combustion chamber 18, thereby raising the gas temperature to state 4 coming out of the combustion chamber 18 in line 20.

The hot compressed gas enters the turbine 22 which converts a portion of the energy in the gas into rotational kinetic energy in the turbine. In the embodiment of FIG. 1, this rotational kinetic energy is used to turn a generator 24 that generated electric power and the compressor 14 that are mounted on a common shaft 26 with the turbine 22.

The gas exits the turbine at a pressure and temperature of state 5 and flows through line 28 to the outgoing side 34 of the heat exchanger 30. In the heat exchanger 30, heat from the relatively hot exhaust gas is transferred to the relatively cold inlet air, as previously mentioned. The cooled exhaust gas exits the heat exchanger at state 6 through line 38 and is vented to the atmosphere.

The compression of the air from state 1 to state 2 in the compressor can be considered, in an idealized model, as an isentropic compression requiring power input. The changes from state 2 to 3 and from state 3 to 4 are constant-pressure increases in temperature that require heat input provided through the heat exchanger 30 and combustor 18, respectively. The expansion of the gas from state 4 to 5 in the turbine is an isentropic expansion that produces a power output. Cooling of the exhaust gas from state 5 to 6 is a constant pressure process with heat removal in the heat exchanger 30, which is accomplished by transferring heat from the hot exhaust gas in outgoing side 34 of the heat exchanger 30 to the relatively cold inlet gas in the incoming side 32.

Figure 2:
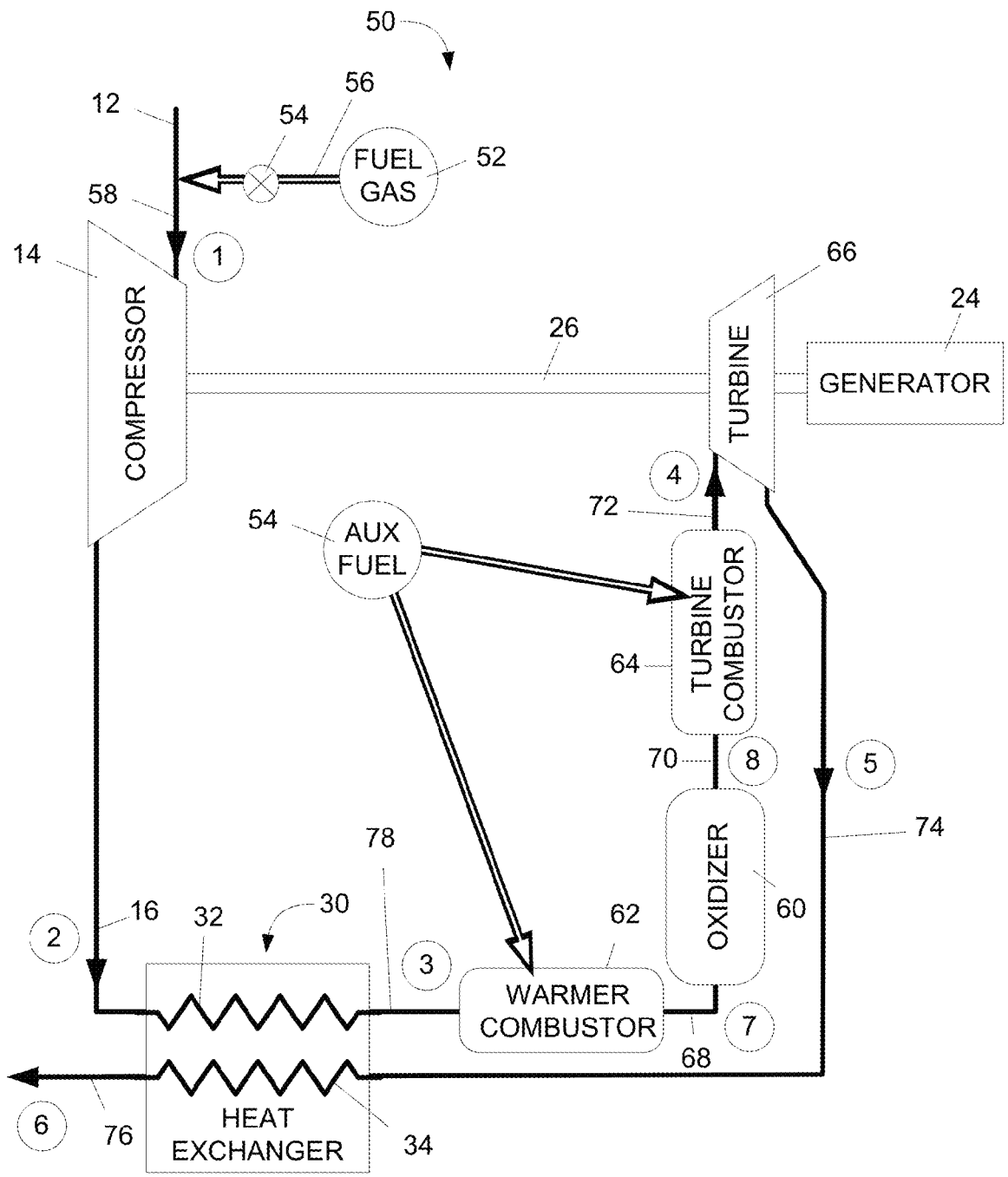
FIG. 2 is a schematic of a multi-combustor turbine system according to certain aspects of this disclosure.

FIG. 2 is a schematic of a multi-combustor turbine system 50 according to certain aspects of this disclosure. In this embodiment, an oxidizer 60 replaces the combustion chamber 18 of FIG. 1 to generate the heat that drives the process. A combustor 64 is located between the oxidizer 60 and the turbine 66 to provide a secondary method of heating the gas before the gas enters the turbine 66. In certain embodiments, this combustor 64 is used to heat the gas during start-up of the turbine system 50.

In certain embodiments, it is desirable to heat the gas entering the oxidizer 60 during start-up so as to facilitate raising the temperature of the oxidizer 60 to an operational temperature. In the embodiments of FIG. 2, this can be accomplished by the warmer combustor 62 located between the compressor 14 and oxidizer 60. In certain embodiments, this is accomplished by an electric heater (not shown), and in certain embodiments, a gas-operated heater or combustor can facilitate raising the temperature of the gas that is introduced into the oxidizer 60. In the embodiments of FIG. 2, a heat exchanger 30 is used to heat the gas coming out of compressor 14 before the gas enters the warmer combustor 62 or the oxidizer 60.

In turbine system 50, air is drawn into compressor 14 through line 12 with the addition that a fuel gas 52 is added to the incoming air through line 56 and valve 54. The fuel-air mixture is carried through line 58 into the compressor 14. In certain embodiments, this fuel gas 52 is a low-energy-content methane-containing gas that is delivered from an external source such as a landfill. The composition of this fuel gas 52 is highly dependent upon the specific site and source.

As a first example of a low-energy-content fuel, gas emanating from a landfill contains only 2 percent methane. In another example application, the fuel gas contains approximately 50% methane and 45% $CO_2$, with the balance of the gas comprising organic compounds and hydrogen sulfide. In certain embodiments, the fuel gas 52 is blended with air to produce a fuel-air mixture having a methane concentration within a target range for the turbine system 50. In certain embodiments, the fuel gas 52 is fed undiluted into compressor 14. The compressor 14 compresses this fuel-air mixture to state 2 in line 16.

The fuel gas 52 may include a single type of fuel and/or multiple different types of fuel, one or all of which may be oxidized in the oxidizer. The fuel gas 52 may include hydrocarbon fuel and/or other types of fuel. The fuel gas 52 may be weak fuel. Weak fuels may include low BTU gases (i.e., low energy per unit mass) and/or fuels having low calorific value. Weak fuels may include gases containing fuels below a concentration that can sustain an open flame and/or other combustion reaction. For example, fuel may be mixed with air with the resultant fuel concentration below a lower explosive limit (LEL) for the fuel.

In some instances, introducing such a weak fuel to a spark or flame, even in the presence of air, may snuff out the spark or flame without oxidizing the fuel in the mixture. However, when the weak fuel is raised to a temperature above its autoignition temperature, the fuel can oxidize in the presence of air without introduction of a spark or flame. A specific example of weak fuels include gas that is mostly carbon dioxide or nitrogen, containing small quantities of methane, ethane, carbon monoxide, and other types of fuel. Such gas is often emitted from so-called unproductive natural gas wells. The fuel gas 52 may include fuels other than, or in addition to, weak fuels. For example, in some implementations, the fuel gas 52 may include propane, butane, kerosene, gasoline, and/or other types of fuels in addition to, or instead of, weak fuels. In some cases, the fuel gas 52 may be hydrogen fuel.

The fuel gas 52 may include gas emanated from a landfill, which may contain only a small percentage of methane fuel (e.g., about 3-5 percent or less). A gas having such a low concentration of methane may be below a lower explosive limit. The lower explosive limit (LEL) of a fuel may refer to the lowest concentration of the fuel in air capable of producing a flash of fire in presence of an ignition source. Concentrations lower than the LEL are typically too weak for combustion. Different types of fuel have different LEL values, typically in the range of approximately about 1 percent to about 5 percent by volume, although some fuels have an LEL outside of this approximate range. Some particular examples of LEL values are (approximately, on a volumetric basis) 3 percent for ethane, 4 percent for hydrogen, 5 percent for methane, and 2 percent for propane.

Fuel in the fuel gas 52 can be a natural (e.g., non-anthropological) fuel source or a human-made (e.g., anthropological) fuel source. For example, the fuel gas 52 may include methane from cattle belches, a swampland, a rice farm, and/or methane produced by fermentation or other biological or chemical processing of organic matter. Other example fuel sources can include manure, municipal waste, wetlands, gas seeping from leaks in the system or other systems, and drilling and recovery operations. In some implementations, the fuel gas 52 includes fuel mixed with water. One or more supplemental fuels may also be utilized by the oxidizer. For example, gas fuels can be provided to the system, and liquid fuels can also be provided to the system.

In some embodiments, combustion gases can be added to the system to adjust performance or operation of the system. For example, in embodiments where a low fuel content mixture does not contain enough fuel for self-sustainable destruction, or in which the oxidation process is incapable of being maintained based on fuel content in the fuel gas 52 alone, combustion gases can be added with air prior to or after the compressor to provide sufficient fuel for the self-sustaining oxidation process. Combustion gases that can be added include, for example without limitation, hydrogen, methane, ethane, ethylene, natural gas, propane, propylene, propadiene, n-butane, iso-butane, butylene-1, butadiene, iso-pentane, n-pentane, acetylene, hexane, and carbon monoxide.

The amount of combustion gases added can be adjusted based on the amount of fuel detected in the fuel gas 52. If there is an undesirable concentration of fuel in the fuel gas 52, the amount of combustion gases added can be increased or decreased in response. In some embodiments, the amount of combustion gases added is based on the amount of fuel content in the fuel gas 52 received by a fuel gas source. In some embodiments, the amount of combustion gases added prior to introducing the fuel gas 52 to the system is based on a temperature of the oxidizer. In some embodiments, the amount of combustion gases added is based on a combination of the amount of fuel content in the fuel gas 52 and a desired change in the temperature or the rate of change of temperature within the oxidizer 60.

With reference to FIG. 2, the fuel-air mixture passes through the incoming side 32 of the heat exchanger 30 and raises the temperature of the fuel-air mixture to state 3 in line 78. In the embodiment of FIG. 2, the fuel-air mixture then enters the warmer combustor 62 where an auxiliary fuel 54, for example propane, can be added to heat the fuel-air mixture. The combustion in or from the warmer combustor 62 thereby further raises the temperature of the gas to state 7 in line 68.

The gas then enters the oxidizer 60, where the fuel undergoes a gradual oxidation process. The fuel may transfer a portion of its thermal energy into the structure of the oxidizer 60, thereby raising the temperature of the oxidizer 60. Optionally, additional auxiliary fuel 54 is injected into the gas and ignited in the turbine combustor 64, further raising the temperature of the gas leaving the turbine combustor 64 in line 72 to state 4 that is sufficient to run the turbine 66. Turbine 66 can be similar to the turbine 22 of FIG. 1 but, in certain embodiments, can be configured to work with a different pressure and temperature of gas. Turbine 66 extracts kinetic energy from the heated gas and drives the compressor 14 and, in certain embodiments, the generator 24 and exhausts the gas at state 5 in line 74.

In steady-state operation, the warmer combustor 62 and turbine combustor 64 are turned down or off, such that little or no auxiliary fuel 54 is being injected into the gas within these combustors. The compressed fuel-air mixture coming out of the compressor 14 is heated in the heat exchanger 30 to a temperature that is below the oxidation temperature of the fuel in the gas. In this operational mode, state 7 of the gas is substantially the same as state 3. After the gas enters the oxidizer 60, the gas is heated by contact with the structure of the oxidizer 60 or by the temperature of heated gas within the oxidizer 60 to a temperature sufficient to cause gradual oxidation of the fuel and organic compounds in the gas, thereby generating heat. This process maintains the temperature of the oxidizer 60 while also raising the temperature of the gas leaving the oxidizer at state 8 to a temperature sufficient to operate the turbine 66.

Figure 3:
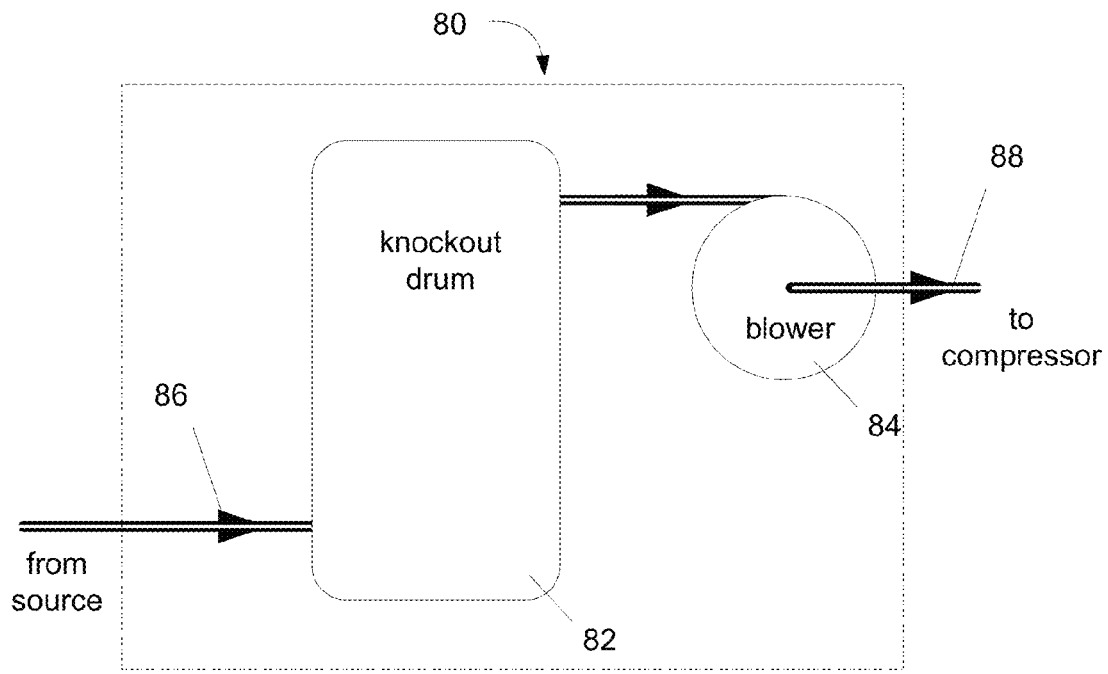
FIG. 3 is a schematic of a fuel supply system according to certain aspects of this disclosure.

Start-up of the turbine system 50 using one or both of the warmer combustor 62 and the turbine combustor 64 may include additional equipment described in FIGS. 3 and 4. The start-up process is discussed in greater detail with respect to FIG. 10.

The composition of the gas that is passing through the various elements of system 50 varies along the flow path. For example, the fuel gas 52 may include entrained liquid that adheres to surfaces of system elements and is thereby removed from the fluid. As a second example, an auxiliary fuel 54 with or without additional air may be injected into the fluid flow before or at the warmer combustor 62 or the turbine combustor 64. This auxiliary fuel can be ignited, thereby adding combustion products and other fluids to the fluid flowing through the system. The term "fluid" is used herein to refer to the mixture of gases, liquids, fuels, and other materials that are flowing through the system 50 regardless of the composition of the mixture.

The composition of the gas entering the oxidizer 60 depends heavily on the source of the fuel gas 52. For a facility such as a landfill, methane-containing gas is generated within the landfill. This gas can be captured using a system of vent tubes placed in the landfill. The gas emanating from the landfill will contain a variable amount of methane as well as numerous other VOCs as well as entrained liquid and particles. The amount of fuel gas 52 injected into the air line 12 at the inlet of the compressor 14 depends on the methane content of the fuel gas, with the intent of achieving a consistent methane content of the gas that enters the compressor 14. In certain embodiments, the gas (e.g., methane) content is desired to be less than about 5% of the total volume of gas. In certain embodiments, the gas (e.g., methane) content is desired to be less than about 2% of the total volume of gas.

One of the benefits of the turbine system 50 is that the gas that is vented to the atmosphere from line 76 contains a very low amount of undesirable gases such as methane, CO, and $NO_x$. For a facility such as a landfill, the methane-containing gas emanating from the landfill is considered a pollutant. In certain embodiments, the turbine system 50 uses the methane-containing gas emanating from the landfill as fuel-gas 52 and converts nearly all of the methane and other VOCs to $CO_2$ and $H_2O$. In certain embodiments, the system 50 can reduce formation of $NO_x$ by maintaining a maximum temperature of the fluid below 1300° C. Thus, the turbine system 50 cleans up a potential source of pollution compared to direct venting of the methane-containing gas emanating from the landfill or use of a flare facility that burns the methane-containing gas at combustion temperatures that may exceed 1300° C. and thereby allow the formation of CO and $NO_x$.

FIG. 3 is a schematic of a gas supply system 80 according to some embodiments of this disclosure. A fuel gas, such as a methane-containing gas emanating from a landfill, is received through line 86. In certain embodiments, this gas is at a pressure above ambient atmospheric pressure. In certain embodiments, this gas is at atmospheric pressure. In certain embodiments, this gas is being actively collected and is at a pressure below ambient. The incoming gas may have liquid entrained in the gas as it enters the line 86.

The gas may pass through a vapor-liquid separator that is often called a "knockout drum." Within knockout drum 82, the entrained liquid tends to separate and fall to the bottom of the knockout drum 82, from which the liquid is at least periodically drained off, while the gas having a reduced amount of entrained liquid passes out at the top of the knockout drum 82. Devices of this type are known to those of ordinary skill in the art. The gas from the knock drum 82 enters the inlet of blower 84, which pressurizes the gas to slightly above atmospheric pressure, such as 1.1 pounds per square inch above ambient, i.e. gauge pressure (psig), in outlet line 88. Line 88 of FIG. 3 is equivalent to line 56 of FIG. 2, wherein the pressurized gas is mixed with ambient air at the inlet of the compressor 14. In certain embodiments, the pressurized gas provided by the gas supply system 80 is of sufficient quantity and contains sufficient oxygen to supply the compressor 14 without requiring additional ambient air.

Figure 4A:
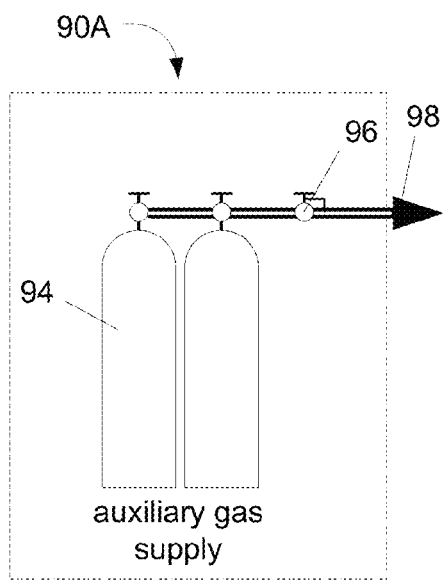
FIG. 4A is a schematic of a start-up system according to certain aspects of this disclosure.

FIG. 4A is a schematic of a start-up system 90A according to certain aspects of this disclosure. The start-up system 90A comprises a supply of an auxiliary fuel 54, with reference to FIG. 2. In the embodiment of FIG. 4, this auxiliary fuel supply 54 comprises at least one compressed-gas cylinder 94 of a high-energy fuel such as propane or methane. In the embodiment of FIG. 4A, the fuel from cylinders 94 is fed through a pressure regulator 96 into line 98 which conveys the pressurized gas to one or both of the turbine combustor 64 and the warmer combustor 62. The use of this system 90A is discussed in greater detail with respect to FIG. 10.

Figure 4B:
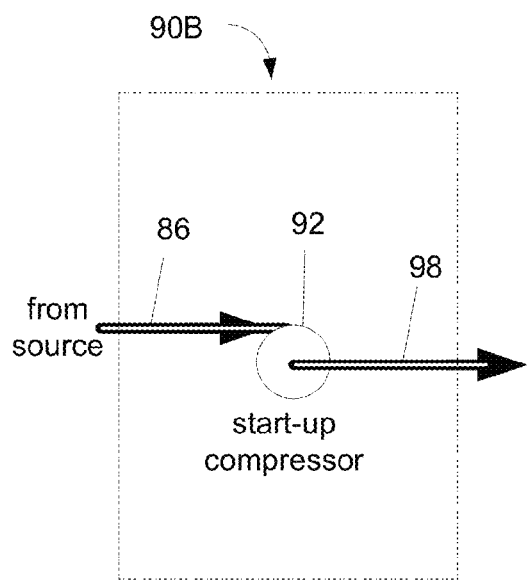
FIG. 4B is a schematic of another embodiment of a start-up system according to certain aspects of this disclosure.

FIG. 4B is a schematic of another embodiment of a start-up system 90B according to certain aspects of this disclosure. In this embodiment, the fuel gas that is received through line 86 of FIG. 3 contains sufficient combustible undiluted fuel gas to sustain combustion. This fuel gas is compressed in the start-up compressor 92 to a pressure that is above the pressure of the gas in lines 78 and 70 of FIG. 2, thereby allowing the gas to be injected into at least one of the warmer combustor 62 and the turbine combustor 64. The pressurized gas is provided on line 98. In certain embodiments, the start-up system 90B includes an accumulator (not shown) attached to line 86. In certain embodiments, the start-up system 90B includes a reservoir (not shown) attached to line 98. In certain embodiments, the start-up system 90B includes a recirculation line (not shown) that allows the start-up compressor 92 to run while not delivering gas through line 98.

Figure 5:
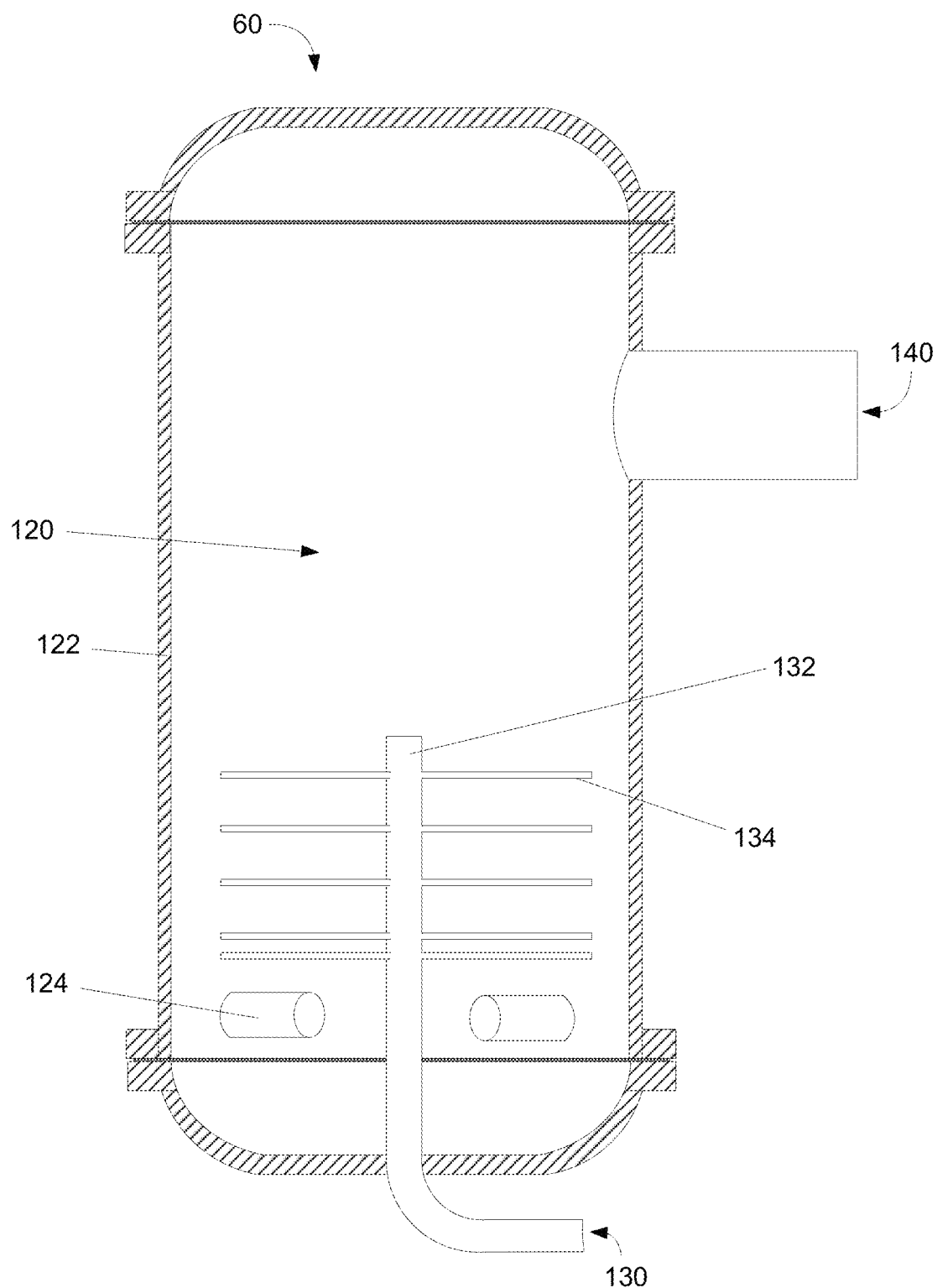
FIG. 5 is a cross-section of an exemplary oxidizer according to certain aspects of this disclosure.

FIG. 5 is a schematic cross-section of an exemplary oxidizer 60 according to certain aspects of this disclosure. The oxidizer 60 includes a pressure vessel 122 having a reaction chamber 120. Gas is received through inlet 130 and, in this embodiment, flows through the distribution tower 132 and then through the plurality of side tubes 134 and into the reaction chamber 120. In this embodiment, the side tubes are perforated (not visible in FIG. 5) such that the gas exits the side tubes 134 at a plurality of points along the side tubes 134.

In certain embodiments, the side tubes are omitted and the gas exits directly from the tower 132 through perforations (not shown). In certain embodiments, the gas is dispersed within the oxidizer through a perforated container (not shown) located at the end of tower 132. In certain embodiments, the interior cavity is at least partially filled with a porous media, such as the ceramic "dog bones" shown in FIG. 9. The gas that exists the side tubes 134 flows through the reaction chamber 120 and out through the outlet 140.

The oxidizer 60 gradually oxidizes fuel by heating the fuel-air mixture received at inlet 130 to or above the fuel's auto-ignition temperature to initiate a spontaneous oxidation reaction. The temperature of the reaction chamber 120, and any media contained in the reaction chamber 120, is maintained within a temperature range selected to maintain gradual oxidation. The fuel concentration and flow rate may be additionally or alternatively controlled to maintain gradual oxidation.

By gradually oxidizing fuel, the oxidizer 60 can enable enhanced control over the fuel oxidation process, thereby accomplishing complete or substantially complete oxidation of the fuel constituents and thus reducing the emission of un-oxidized fuels into the environment. The gradual oxidation process may also reduce thermally generated environmental pollutants (e.g. $NO_x$) and reduce or eliminate the need for expensive catalyst materials. In certain embodiments, the formation of $NO_x$ can be reduced by maintaining the maximum temperature of all points along the flow path below a temperature such as 1300° Celsius (C). In certain embodiments, the oxidizer 60 may reduce or eliminate the formation of contaminants (e.g. silica) that can form during the combustion of certain fuel gases and are harmful to gas turbine system components. In certain embodiments, the oxidizer 60 may also trap the contaminants (e.g. silica) and prevent the contaminants from reaching the turbine 66.

The volume and shape of the reaction chamber 120 can be designed to provide a low flow rate through the reaction chamber 120, allowing sufficient time for the fuel oxidation reactions to be completed. As an example, if the reaction chamber 120 is designed such that the average flow rate is less than ten feet per second and the length of the chamber is ten feet, then the average residence time of the gas in the chamber can be at least one second.

The volume and shape of the reaction chamber 120, and the configuration of the overall system, can be designed to provide a controlled flow and flow rate through the chamber, allowing sufficient residence time for complete fuel oxidation. The flow path can be sufficiently long that a flow rate of the air and fuel mixture along the flow path, averaged over the length of the flow path, allows the fuel to oxidize to completion. As an example, the average residence time of the gas in the chamber can be equal to or greater than one second in some cases. The average residence time of the gas in the chamber can be less than one second in some cases.

In some embodiments, the residence time of the gas in the chamber can range from about 0.1 second to about 10 seconds. In some embodiments, the residence time of the gas in the chamber can range from about 0.5 second to about 5 seconds. In some embodiments, the residence time of the gas in the chamber can range from about 0.5 second to about 2 seconds. In some embodiments, the residence time of the gas in the chamber can range from about 0.5 second to about 1 second. In some embodiments, the residence time of the gas in the chamber can range from about 1 second to about 2 seconds. In some embodiments, the residence time of the gas in the chamber can be less than about 0.1 second or more than about 10 seconds. The rate of oxidation of the mixture is a function of the constituents of the fuel, fuel concentration, oxygen concentration, pressure, temperature and other factors. Thus, the rate of oxidation can be adjusted by adjusting these parameters accordingly.

The thermal mass of the material within the reaction chamber 120 may help stabilize temperatures for gradual oxidation of the fuel. In certain embodiments (e.g. when there is an oversupply of fuel in the reaction chamber 120), the thermal mass within the reaction chamber 120 may act as a dampener, absorbing some heat and protecting the turbine from excessively hot gas leaving the oxidizer 60. In other cases (e.g. when there is a low supply of fuel in the reaction chamber 120), the thermal mass within the reaction chamber 120 may provide a temporary source of energy, helping to sustain oxidation of the fuel. In certain embodiments, the oxidizer 60 includes a flame arrestor (not shown) near the inlet 130 that is configured to suppress transfer of heat energy out of the reaction chamber 120, thereby confining the oxidation reaction to the reaction chamber 120.

The reaction chamber 120 may also be adapted to promote mixing of the fuel-air mixture as it flows through the reaction chamber 120. For example, the reaction chamber 120 may include flow diverters to control a residence time (e.g. an amount of time a given volume of the fuel-air mixture traverses the flow path through the reaction chamber 120) and/or to help maintain the temperature in certain regions within the reaction chamber 120 at or near a specified temperature, e.g. the auto-ignition temperature of the fuel. As another example, the reaction chamber 120 may include internal heat transfer zones, where a hotter section of the flow path imparts heat to a cooler section of the flow path within the reaction chamber 120.

In certain embodiments, one or more heat sources are disposed within the reaction chamber 120 to achieve the appropriate temperature distribution within the reaction chamber 120. In certain embodiments, these heat sources are anchor heaters 124 shown in FIG. 5 and discussed in greater detail in FIG. 8.

Figure 6:
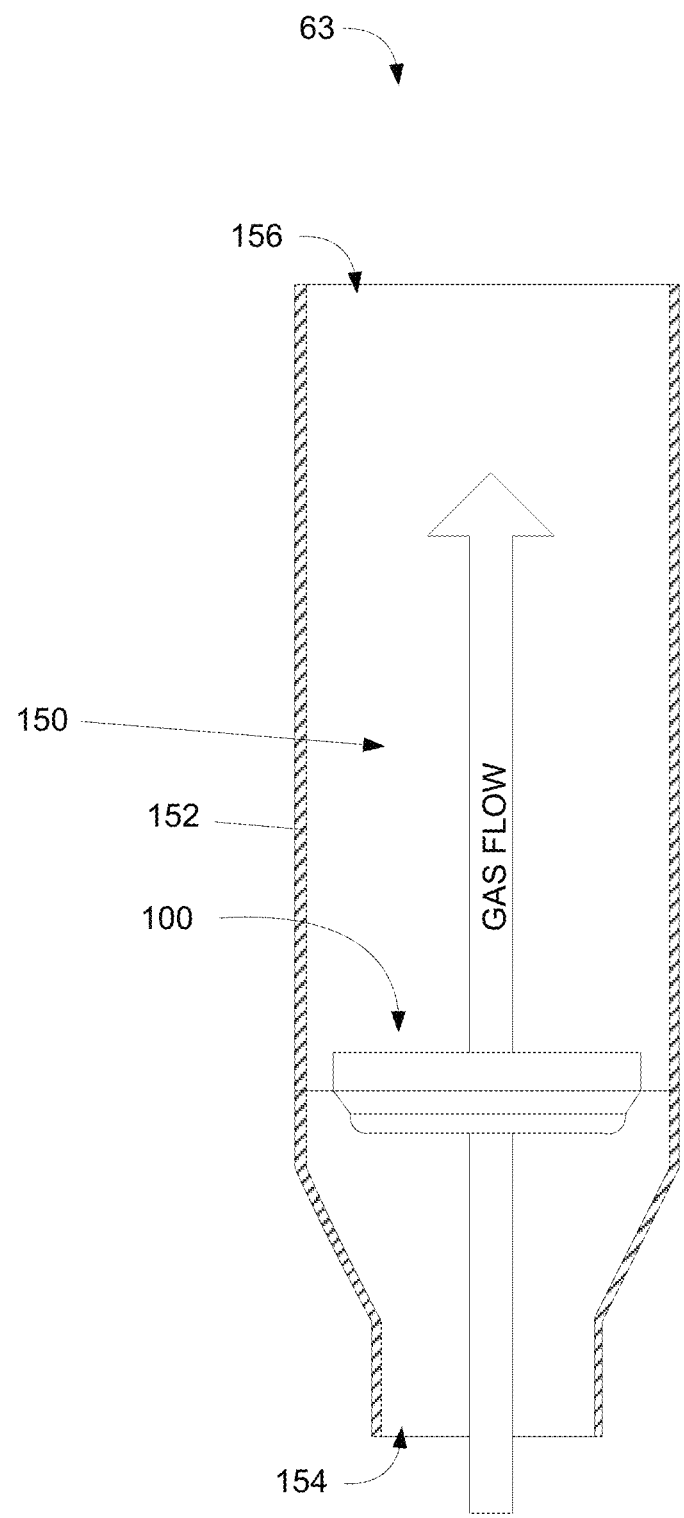
FIG. 6 is cross-section of an exemplary combustor according to certain aspects of this disclosure.

FIG. 6 is a cross-section of an exemplary combustor 63 according to certain aspects of this disclosure. In this embodiment, the combustor 63 includes a housing 152 having a combustion chamber 150 through which gas flows from the inlet 154 to the outlet 156 as indicated by the arrow. In this embodiment, a burner 100 is located at an upstream end of the combustion chamber 150. The burner is discussed in greater detail with respect to FIGS. 7A-7C. In certain embodiments, the combustor 63 comprises an electric heater (not shown). In certain embodiments, the combustor 63 comprises an external burner (not shown) that heats the air flowing through the combustion chamber 150 without using the gas within the combustion chamber 150 as part of the combustion process of the external burner.

FIG. 7A is a perspective view of an exemplary burner 100 according to certain aspects of this disclosure. In this embodiment, the burner 100 is circular. A gas comprising a flammable fuel is fed into the distribution channel 102 and dispersed through a plurality of orifices 108 into a combustion channel 106 that surrounds the fluid channel 110. When installed in a combustor 63 as illustrated in FIG. 6, the fluid passing from the inlet 154 through the combustion chamber 150 to the outlet 156 passes at least partially through the fluid channel 110 while the combustion reaction is taking place in the surrounding combustion channel 106. Combustion products from the combustion reaction are carried away by the fluid flowing through the combustor 63.

In certain embodiments, the gas fed into the distribution channel 102 comprises oxygen to at least partially support the combustion reaction. In certain embodiments, the gas fed into the distribution channel comprises sufficient oxygen to fully support the combustion reaction, such that the fuel-air mixture of the fluid coming in through the inlet 154 is appropriate for the oxidation process that takes place in the oxidizer 60 regardless of whether the burner 100 is operating.

FIG. 7B is a front view of the burner 100 of FIG. 7A according to certain aspects of this disclosure. The fluid channel 110 has a clear diameter 112 and the combustion channel 106 is formed from shaped elements 104A and 104B such that the gas orifices 108 are positioned, in this embodiment, at a radial midpoint in the combustion channel 106.

FIG. 7C is a cross-section of the burner 100 of FIG. 7A according to certain aspects of this disclosure. The cross-section is taken along dashed line C-C in FIG. 7B and is shown without the background to enhance clarity. The distribution channel 102 has a nominal diameter 114. The profiles of shaped elements 104A and 104B can be seen in the view of FIG. 7C.

Figure 8:
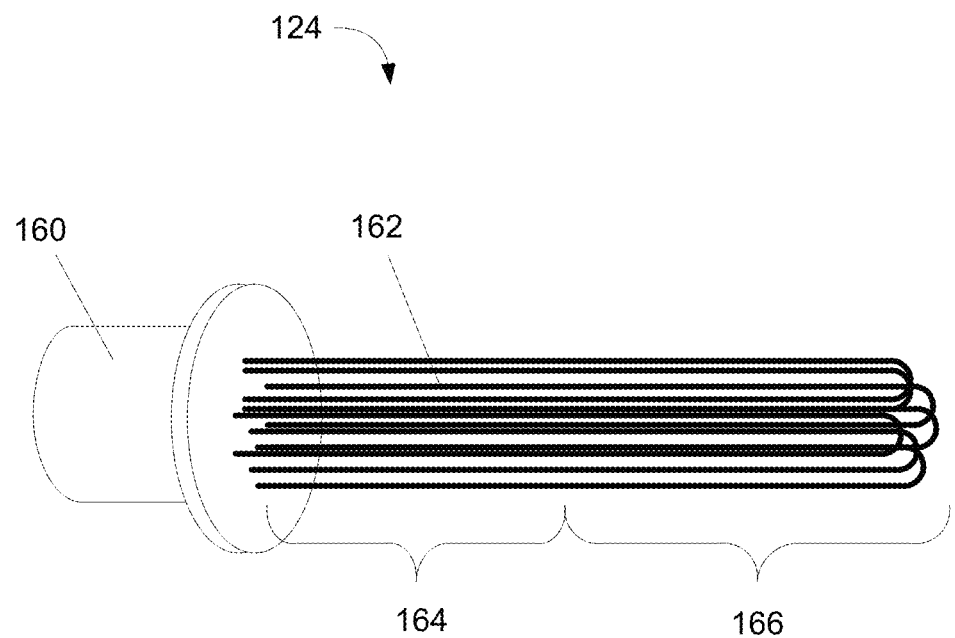
FIG. 8 is a perspective view of an anchor heater according to certain aspects of this disclosure.

FIG. 8 is a perspective view of an anchor heater 124 according to certain aspects of this disclosure. The base 160, in this embodiment, penetrates the pressure vessel 122 such that the heating elements 162 are located within the reaction chamber 120. In certain embodiments, the heating elements 162 have active portions 166 that generate heat and inactive portions 164 that are conductive but do not generate a significant amount of heat.

Figure 9:
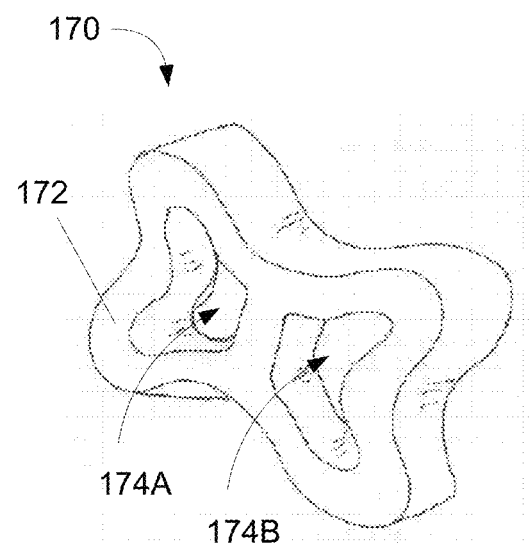
FIG. 9 is a perspective view of an exemplary porous element according to certain aspects of this disclosure.

FIG. 9 is a perspective view of an exemplary porous element 170 according to certain aspects of this disclosure. The element comprises a shaped structure 172 having, in this embodiment, two holes 174A and 174B. The shaped structure 172 comprises a refractory material. In certain embodiments, the heat-resistant material is a ceramic. In certain embodiments, a plurality of porous elements 170 are disposed in the reaction chamber 120 of the oxidizer 60. In certain embodiments, the porous elements 170 are piled randomly within the reaction chamber 120 such that at least one tortuous flow path exists from the inlet 130 to the outlet 140 through the plurality of porous elements 170. In certain embodiments, the porous elements have other shapes. In certain embodiments, the reaction chamber 120 contains a structured ceramic packing (not shown).

Figure 10:
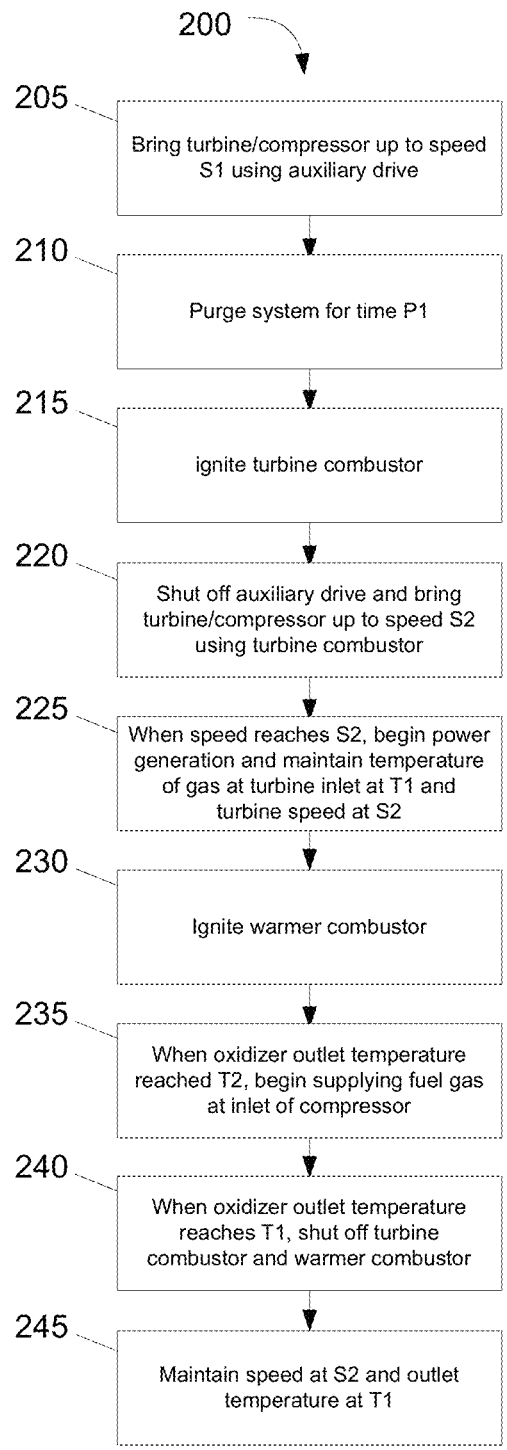
FIG. 10 is a flowchart of an exemplary start-up process according to certain aspects of this disclosure.

FIG. 10 is a flowchart of an exemplary start-up process 200 according to certain aspects of this disclosure. The process shown in FIG. 10 is related to the system 50 of FIG. 2. The starting configuration of this process is that the linked turbine 22, compressor 14, and generator 24 are stopped, the fuels 52 and 54 are not being supplied, and the elements of system 50 are at ambient temperature, sometimes referred to as "cold." In order to simplify the description herein it will be recognized that the turbine 22, compressor 14, and generator 24 are fixedly attached to a common shaft 26, and it will be understood that a reference to a speed of any one of the turbine 22, compressor 14, or generator 24 implies that the other elements are rotating at the same speed.

In step 205, the turbine 22 is started and brought up to a first speed S1 using an auxiliary drive. In certain embodiments, the generator 24 can be driven as a motor, powered from an external power source, and act as the auxiliary drive. In certain embodiments, a separate motor (not shown in FIG. 2) is provided to start up the turbine. In certain embodiments, this separate motor is an electric motor. In certain embodiments, this separate motor is a gasoline or diesel engine. For example, speed S1 may be 16,000 revolutions per minute (RPM).

In step 210, the turbine 22 is held at speed S1 for an amount of time P1 while air is drawn in through line 12 into compressor 14 without the addition of fuel gas 52 or auxiliary gas 54. Compressor 14 compresses the air and pushed the compressed air through the system 50 to the turbine 22 so as to purge the system. In certain embodiments, the turbine 22 may be held at a speed different from S1 or allowed to vary over the time P1. In certain embodiments, the speed of the turbine 22 is allowed to drop to a lower speed (not shown in FIG. 10) such as, for example, 10,000 RPM after time P1 has elapsed.

Auxiliary fuel 54 is supplied to turbine combustor 64, and the turbine combustor 64 is ignited in step 215. In certain embodiments, auxiliary fuel 54 is a commercially available fuel gas, such as propane, provided by a start-up system 90A as shown in FIG. 4A. In certain embodiments, auxiliary fuel gas 54 is provided by a start-up system 90B such as shown in FIG. 4B, wherein the fuel gas 52 is compressed by compressor 92. Once the turbine combustor 64 is lit, the auxiliary drive is shut off in step 220 and the turbine 22 is driven by the hot, compressed gas provided by the turbine combustor 64. The turbine 22 is brought up to a speed S2 using the turbine combustor 64. For example, speed S2 may be 52,000 RPM. During this time, the amount of fuel provided by start-up systems 90A or 90B may be controlled by a first controller (not shown in FIG. 2) that senses the speed of the turbine 22 and the temperature of the gas at the inlet of the turbine 22.

When the turbine 22 reaches speed S2 in step 225, the power generator 24 is activated. The generation of electric power by the power generator 24 places a load on the turbine 22. In certain embodiments, a second controller (not shown in FIG. 2) senses the speed of the turbine 22 and controls the amount of power being generated by the power generator 24, thereby varying the load on the turbine 22. While the first controller is maintaining the temperature of the gas at the inlet of the turbine 22 at a setpoint S1, the second controller maintains the speed of the turbine 22 at speed S2 by varying the load.

Maintaining the turbine 22 at a constant speed S2 stabilizes the flow rate of fluid through the system 50. In the embodiments of system 50 shown in FIG. 2, the hot, expanded exhaust gas from turbine 22 is directed through the "hot" portion 34 of heat exchanger 30 as the cooler gas leaving the compressor 14 is directed through the "cold" portion 32 of the heat exchanger 30. The heat exchanger 30 is configured to thermally couple the gas within the hot portion 34 to the gas within the cold portion 32. Heat will therefore be transferred from the hot gas leaving the turbine 22 to the cooler gas leaving the compressor 14. The warmed gas leaving the cold portion 32 of the heat exchanger 30 will heat the oxidizer 60. In certain embodiments, however, this heat is not sufficient to bring the temperature of the oxidizer 60 up to the auto-ignition temperature of the fuel gas 52. Additional heat can be added to the oxidizer 60 to raise its temperature to the auto-ignition temperature of fuel gas 52.

In step 230, auxiliary gas 54 is provided to the warmer combustor 62 and the warmer combustor 62 ignited. In certain embodiments, additional air is injected with the auxiliary fuel 54 to at least partially support the combustion of the auxiliary fuel 54. Combustion of the auxiliary fuel 54 creates heat within the warmer combustor 62 that further heats the compressed gas that passed through the heat exchanger 30. In certain embodiments, the amount of fuel provided to the warmer combustor 62 may be controlled by a third controller (not shown in FIG. 2) that senses the temperature of the gas at the outlet of the oxidizer 60. The heat provided by the warmer combustor 62 will increase the temperature of the oxidizer 60 until it reaches a temperature setpoint T2 that is above the auto-ignition temperature of the fuel gas 52. For example, temperature T2 may be 700° C. The temperature of the gas leaving the oxidizer 60 will reflect the temperature of the oxidizer 60, as no fuel gas 52 is being provided yet and therefore there is no gradual oxidation process taking place in the oxidizer 60.

When the temperature of the gas at the outlet 140 of the oxidizer 60 reaches temperature T2 in step 235, valve 54 is opened and fuel gas 52 is provided at the inlet of compressor 14. The fuel gas 52 will oxidize in oxidizer 60 thereby raising the temperature of the oxidizer 60 and the temperature of the gas at the outlet 140. The third controller continues to regulate the warmer combustor 62 with a new setpoint of gas temperature T1 at the outlet of the oxidizer 60. For example, T1 may be about 700° C. In certain embodiments, T1 may be about 900° C. In some embodiments, T1 may range from about 700° C. to about 900° C. In certain embodiments, T1 may be less than about 700° C. or greater than about 900° C.

In step 240, when the temperature of the gas at outlet 140 reaches temperature T1, i.e., is sufficient to drive turbine 22 without additional heat being provided by turbine combustor 64, the turbine combustor 64 can be gradually or immediately shut off. When the third controller has reduced the operation of warmer combustor 62 to a determined level, indicating that sufficient heat is being generated by the oxidation process in oxidizer 60 to maintain the gas temperature at the outlet 140 at temperature T1, the warmer combustor 62 is gradually or immediately shut off.

Step 245 is the steady-state operation of the system 50. The third controller now regulates the amount of fuel gas 52 provided to the inlet of compressor 14 so as to maintain temperature of the gas at the outlet of the oxidizer 60, and therefore the temperature of the gas at the inlet of turbine 22, at temperature T1. The thermal mass of the oxidizer 60, in certain embodiments, is sufficient to make the system 50 very slow to respond to a change in the rate of delivery of fuel gas 52 at the inlet to the compressor 14. In certain embodiments, the second controller maintains the speed of the turbine 22 at speed S2 in steady-state operation by varying amount of power being generated by the power generator 24 as previously discussed.

While the discussion of speed and temperature controllers herein is presented in terms of a single-value setpoint, it will be apparent to those of skill in the art that the setpoint may be a range of values associated with the setpoint. For example, maintaining the speed of turbine 22 at setpoint S2 should be interpreted to include maintaining the speed of turbine 22 within a range between S2-low and S2-high. Similarly, reaching a temperature setpoint T1 should be interpreted to include the temperature teaching a lower limit T1-low of a range T1-low to T1-high, and maintaining the temperature at setpoint T1 should be interpreted to include maintaining the temperature between the upper and lower limits T1-low and T1-high.

In some embodiments, the system 50 is configured to reduce or eliminate formation of nitrogen oxides by maintaining a maximum temperature within the reaction chamber 120 that is below a threshold temperature of considerable formation of nitrogen oxides. For example, in some embodiments, the maximum temperature within the reaction chamber 120 is below about 2300° F. In some embodiments, the maximum temperature within the reaction chamber 120 may range from about 1900° F. to about 2300° F. In some embodiments, the maximum temperature within the reaction chamber 120 may range from about 2100° F. to about 2300° F. In some embodiments, the maximum temperature within the reaction chamber 120 may range from about 2200° F. to about 2300° F. In some embodiments, the maximum temperature within the reaction chamber 120 can be greater than about 2300° F. or less than about 1900° F.

Figure 11:
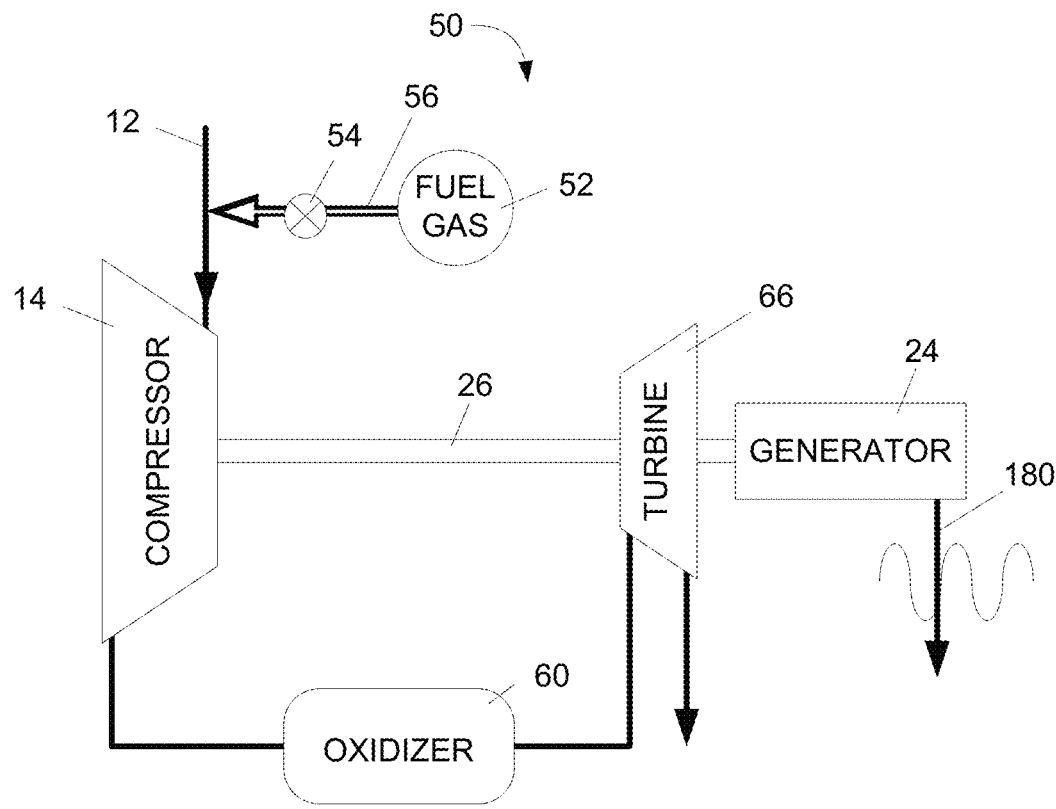
FIG. 11 is a simplified schematic of the multi-combustor turbine system of, for example, FIG. 2 according to certain aspects of this disclosure.

FIG. 11 is a simplified schematic of the multi-combustor turbine system of FIG. 2 according to certain aspects of this disclosure. This schematic depicts the elements that implement the control loops of FIGS. 12 and 13 and is provided as a reference for those figures. The schematic of FIG. 11 additionally shows power output 180 from power generator 24.

Figure 12:
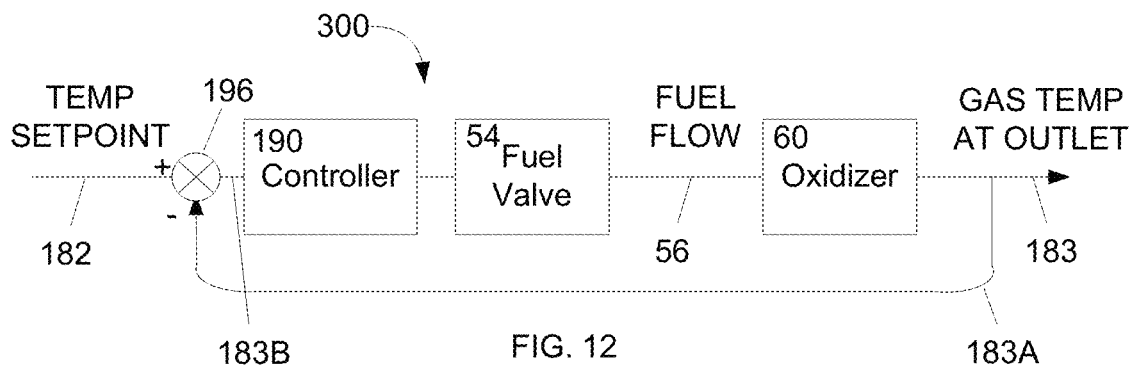
FIG. 12 is a control diagram of the control loop for the temperature of the gas at the oxidizer outlet according to certain aspects of this disclosure.

FIG. 12 is a control diagram of the control loop 300 for the temperature of the gas at the oxidizer outlet 140 according to certain aspects of this disclosure. The gas temperature 183 is measured at the outlet 140 of the oxidizer 60 and converted to a feedback signal 183A that is combined with a temperature setpoint signal 182 at junction 196. The resulting error signal 183B is fed into controller 190, which controls the fuel valve 54. The controller 190 adjusts the fuel valve 54 in response to the error signal 183B to change the fuel flow 56 into the inlet of compressor 14 and then into the oxidizer 60. The change in fuel flow 56 will change the amount of heat generated in oxidizer 60, thereby changing the gas temperature 183. As the oxidizer 60 may have a large thermal mass, this control loop 300 may have a very large time constant, resulting in a very slow response of the gas temperature 183 to changes in the error signal 183B.

Figure 13:
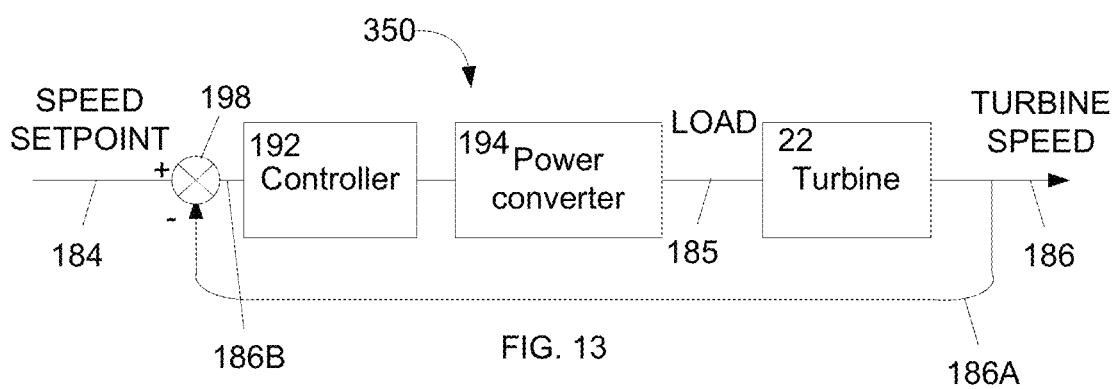
FIG. 13 is a control diagram of the control loop for the speed of the generator, turbine, and compressor according to certain aspects of this disclosure.

FIG. 13 is a control diagram of the control loop 350 for the speed of the generator 24, turbine 22, and compressor 14 according to certain aspects of this disclosure. The turbine speed 186 is measured and converted to a feedback signal 186A that is combined with a speed setpoint signal 184 at junction 198. The resulting error signal 186B is fed into controller 192, which controls the power converter 194 (not shown separately) that is a part of the power generator 24. The power converter controls the amount of power being generated by the rotating elements (not shown separately) of the power generator 24 and therefore controls the load 185 on the turbine 22 that is driving the rotating elements. As the load 185 changes, and while the temperature of the gas at the inlet of the turbine 22 remains constant, the speed of the turbine 22 will change. Control system 350 has a small time constant, relative to the control loop 300, and so the turbine speed 186 can changed much faster than the gas temperature 183.

Control loops 300 and 350 may be operated simultaneously as their control bandwidths are separated. Control loop 300 can be considered the outer control loop, making very slow changes to the fuel flow 56 to control the gas temperature 183, while control loop 350 can be considered the inner control loop making relatively fast changes to the load 185 to control the turbine speed. Due to the slow response of control loop 300, the gas temperature 183 will vary over long periods of time while the fast, inner control loop 350 maintains the turbine speed 186 constant as the varying gas temperature 183 appears to be constant relative to the speed of response of control loop 350.

Figure 14:
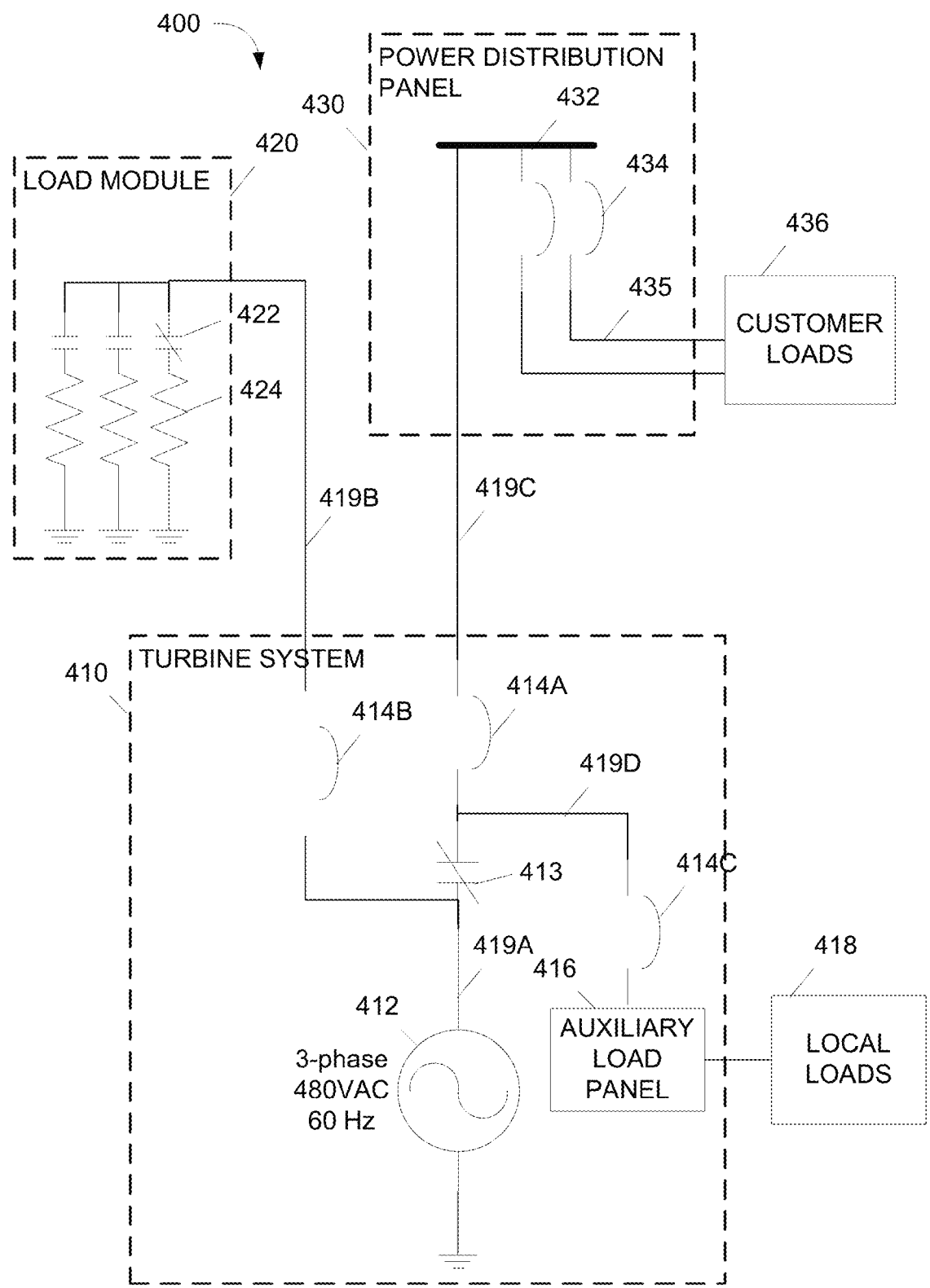
FIG. 14 is an exemplary schematic of a power generation system according to certain aspects of this disclosure.

FIG. 14 is an exemplary schematic of a power generation system 400 according to certain aspects of this disclosure. The system 400 includes a turbine system 410, a load module 420, and a power distribution module 430. The turbine system 410 includes, in some embodiments, a wound rotor synchronous generator (WRSG) 412 that provides three-phase power at 480 volts of alternating current (VAC) at 60 Hz, a common configuration of commercial power grids. The WRSG 412 provides the three-phase power on line 419A, shown in FIG. 14 as a single line although three-phase power is transferred on at least three lines, to a power relay 413 capable of switching the entire current capacity of the system, for example 600 A. The function of power relay 413 is discussed in greater detail with respect to FIG. 15. Line 419A also is connected to a circuit breaker 414B that feeds the same three-phase power over line 419B to the load module 420. When power relay 413 is closed, as shown in FIG. 14, the three-phase power is provided to circuit breakers 414A and 414C. Circuit breaker 414A is, in this embodiment, rated to the same capacity as the power relay 413, for example 600 A, and then through output line 419C to the power distribution panel 430. Circuit breaker 414C is rated to a lower value, for example 50 A, and feeds power to an auxiliary load panel 416 to drive local loads 418 within the system. In certain embodiments, the auxiliary load panel 416 provides single phase 120 VAC power to the local loads 418.

The load module 420 includes one or more sets of relays 422 and loads 424. In certain embodiments, the loads 424 are resistive elements. The multiple loads 424 can be selectively connected to the output of the WRSG 412 to provide braking or to serve as a dummy load during start-up of the system 400 prior to closure of power relay 413. In certain embodiments, the total load of the load module 320, when all loads 424 are connected, is 165 kW. In certain embodiments, the rating of circuit breaker 414B is set to be below the peak current that can be handled by the total load, for example 225 A for a 165 kW load module 420, wherein (225 A)(480 Vrms)(1.4)=152 kW.

The power distribution panel 430 is a standard commercial system wherein the three-phase power coming in on line 419C is connected to a distribution bus 432. The distribution bus 432 is also connected, in this embodiment, to other power sources generating three-phase 480VAC 60 Hz power. One or more load circuits 435 are connected through circuit breakers 434 to the distribution bus 432 and tap off power to feed to customer loads 436. In certain embodiments, one or more of lines 435 carry three-phase power. In certain embodiments, one or more of lines 435 carry single-phase power. In certain embodiments, the power distribution panel 430 is provided by a customer who is purchasing the power being provided over line 419C.

The stator winding (not visible) of the WRSG 412 is coupled directly to the distribution bus 432 and hence the rotational speed of the WRSG 412 is fixed by the frequency of the distribution bus 432. The rotor winding (not visible) of the WRSG 412 is excited with direct current, for example from the auxiliary load panel 416, using slip rings and brushes (not visible) or with a brushless exciter with a rotating rectifier (not visible). The speed of the WRSG 412 is determined by the frequency of the rotating field created by the rotor and by the number of pole pairs of the rotor. For the example system of FIG. 14, the WRSG 412 includes a 4-pole rotor and generates power at 60 Hz, and therefore operates at 3600 RPM. In certain embodiments disclosed herein, the WRSG 412 replaces the generator 24 of FIG. 2 and is driven by the turbine 66. The power output of the WRSG 412 is determined by the torque input from the turbine 66, as the output voltage and frequency are fixed. In certain embodiments, a gearbox (not shown) is provided between the turbine 22 and WRSG 412 as the turbine 22 preferentially operates at a much higher speed, for example 52,000 RPM, compared to the speed of the WRSG 412, for example 3600 RPM.

Figure 15:
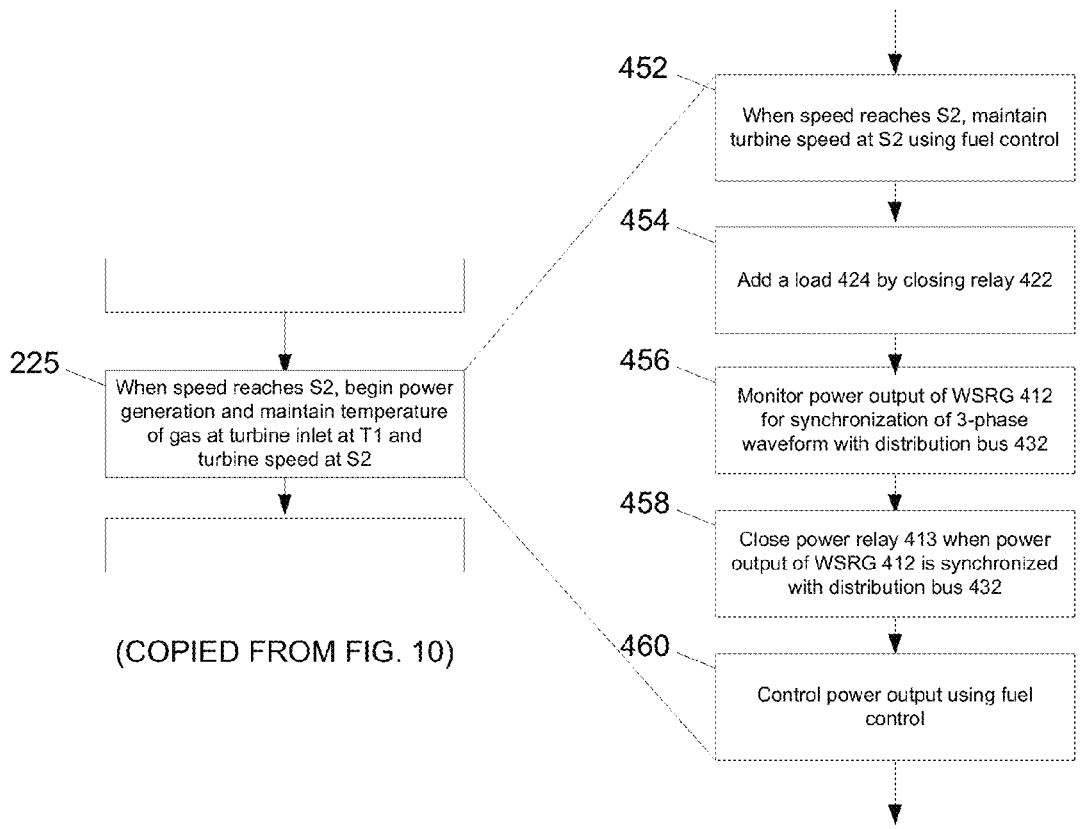
FIG. 15 depicts a more detailed description of the control process of FIG. 10 with respect to, for example, the system of FIG. 14 according to certain aspects of this disclosure.
Figure 16:
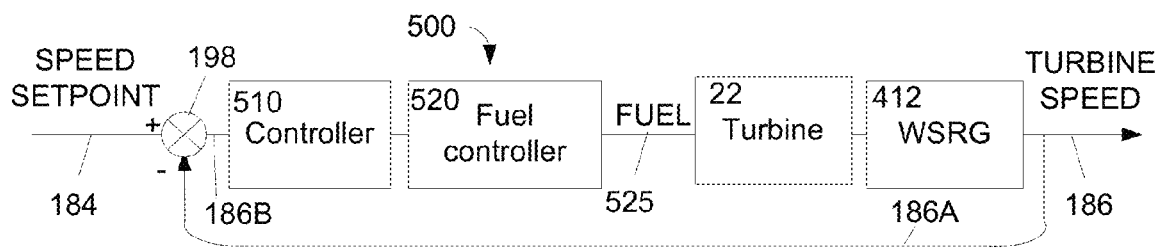
FIG. 16 depicts an exemplary turbine speed control loop adapted for the process of, for example, FIG. 15 according to certain aspects of this disclosure.
Figure 17:
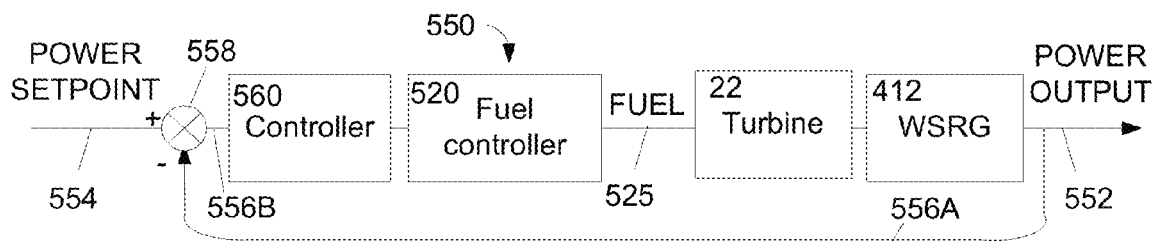
FIG. 17 depicts an exemplary power output control loop adapted for the process of, for example, FIG. 15 according to certain aspects of this disclosure.

FIG. 15 depicts a more detailed description of the control process 200 of FIG. 10 with respect to the system 400 of FIG. 14 according to certain aspects of this disclosure. In particular, the step 225 of process 200 is expanded with respect to how this step is accomplished with a system 400 comprising a WRSG 412. The process 200 follows the steps 205-220 as shown in FIG. 10, then transitions to step 452 of FIG. 15 wherein the turbine speed is initially maintained using a fuel control feedback loop such as shown in FIG. 16. In step 454, one or more loads 424 are connected to the output of WRSG 412 by closing the respective relays 452 of load module 410 thereby stabilizing the speed of the WRSG 412. The amount of load provided by the load module 410 is a function of the oxidizer 60 temperature, wherein very little load may be required when the oxidizer 60 is cold while a large load may be required when the oxidizer 60 is hot. In certain embodiments, approximately 40 kW of load is added. In step 456, the speed of the WRSG 412 is then varied about the nominal operating speed, for example the 3600 RPM disclosed above, while the phase alignment between the three-phase output of the WRSG 412 and the existing three-phase voltage on distribution bus 432 is monitored. When synchronization of the output of the WRSG 412 and the existing voltage on distribution bus 432 is detected, relay 413 is closed in step 458 thereby connecting the output of the WRSG 412 to the distribution bus 432. As the speed is now controlled by the line frequency on the distribution bus 432, the process moves to step 460 and controls the power output using a fuel control feedback loop such as shown in FIG. 17. The process then proceeds as shown in FIG. 10 starting at step 230.

FIG. 16 depicts an exemplary turbine speed control loop 500 adapted for the process of FIG. 15 according to certain aspects of this disclosure. This control loop is operational during steps 452-456 of the process of FIG. 15. The speed 186 of the WRSG 412 is sensed and fed back as a signal 186A to a summing junction 198 where the feedback signal 186A is combined with a speed setpoint signal 184, producing a speed error signal 186B. A controller 510 accepts the error signal 186B and provides a control signal to a fuel controller 520 that adjusts the flow of fuel 525 to the turbine 22 that drives the WRSG 412. With the fixed load of the load module 420, the speed of the WRSG 412 will vary in response to variations in the fuel flow 525.

FIG. 17 depicts an exemplary power output control loop 550 adapted for the process of FIG. 15 according to certain aspects of this disclosure. This control loop is operational during step 460 of the process of FIG. 15. The output power 552 from the WRSG 412 is sensed and fed back as signal 556A to a summing junction 1558 where the feedback signal 556A is combined with a speed setpoint signal 554, producing a speed error signal 556B. A controller 560 accepts the error signal 556B and provides a control signal to the fuel controller 520 that adjusts the flow of fuel 525 to the turbine 22 that drives the WRSG 412. As the speed of the WRSG 412 is fixed in relation to the frequency and phase of the voltage on distribution bus 432, the power output of the WRSG 412 will vary in response to variations in the fuel flow 525 while the speed of the WRSG 412 remains essentially constant.

Figure 18:
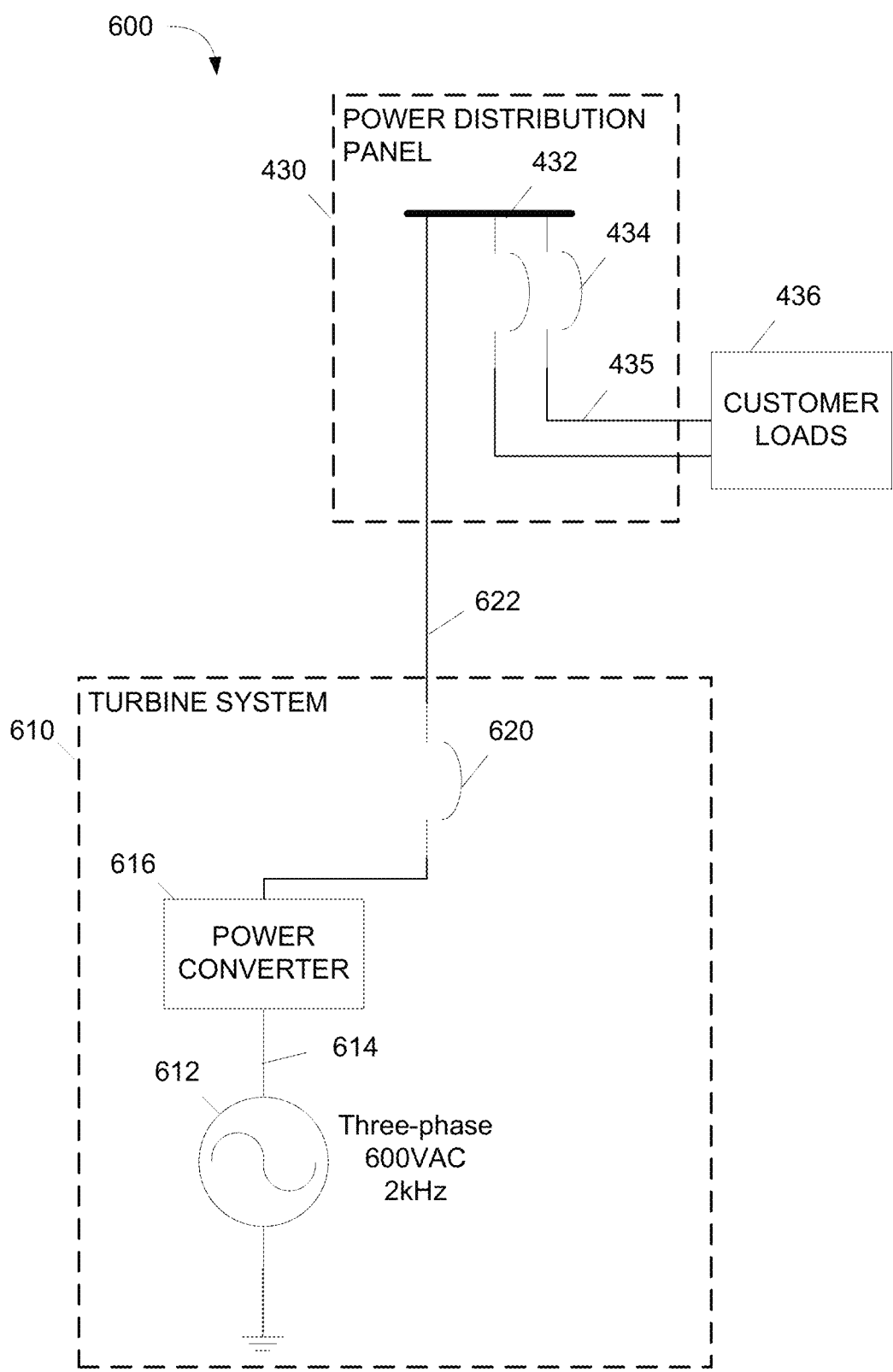
FIG. 18 is an exemplary schematic of a power generation system according to certain aspects of this disclosure.

FIG. 18 is an exemplary schematic of a power generation system 600 according to certain aspects of this disclosure. The system 600 includes a turbine system 610 and can include the power distribution module 430 from FIG. 14. The turbine system 610 includes, in this embodiment, a permanent magnet generator (PMG) 612 that provides three-phase power at a relatively high voltage, for example 600-800 VAC, at a relatively high frequency, for example 2000-2400 Hz. In the embodiment of FIG. 18, the PMG provides an output of 600 VAC at 2 kHz. The power output 614 of the PMG 612 is coupled to a power converter 616 that converts the output power 614 to, in this example, three-phase 480VAC 60 Hz power on line 622. In certain embodiments, the power converter 616 provides power at other frequencies and voltages. In certain embodiments, the power converter 616 provides single-phase and/or two-phase power. The turbine system 610 also includes, in this embodiment, a circuit breaker 620 on the output of power converter 616.

In certain embodiments, the PMG 612 is coupled directly to the turbine 22 (not shown in FIG. 18), eliminating the need for a gearbox. The rotor (not visible) of the PMG 612 includes a number of permanent magnets arranged in a multi-pole configuration to provide the rotating magnetic field when the rotor is rotated by the turbine 22. The stator winding (not visible) of PMG 612 are connected to the power inverter 626. In certain embodiments, the power converter 616 can accept a variable input voltage and frequency and provide the desired voltage and frequency on line 622. This allows the turbine 22, and therefore the PMG 612, to operate over a range of speed while still delivering power on line 622.

Figure 19:
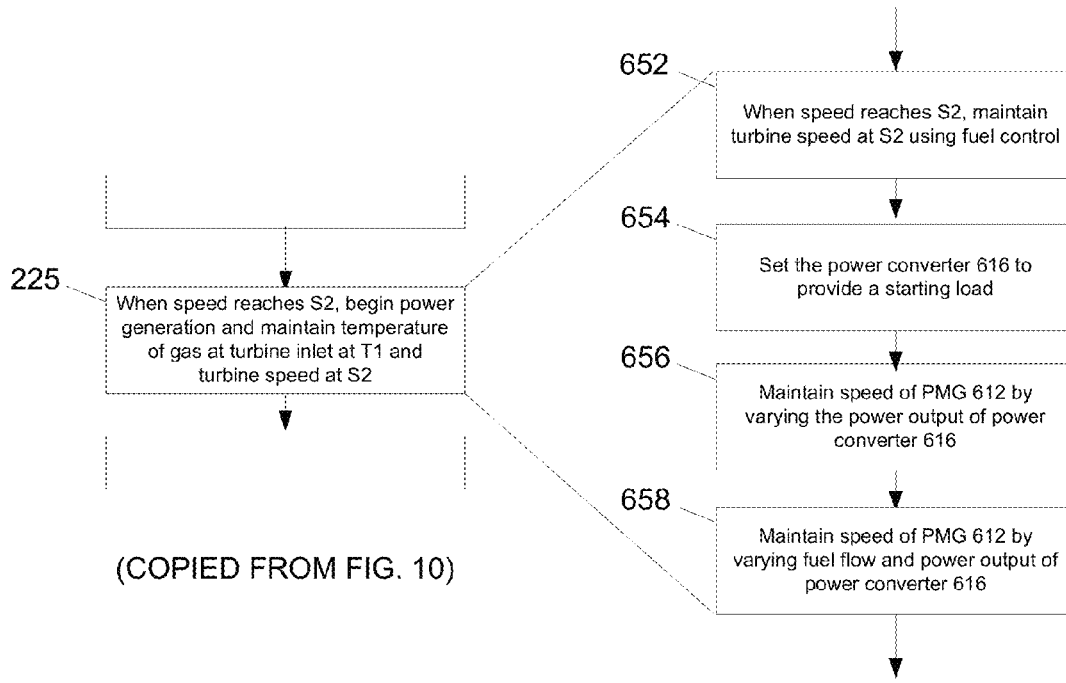
FIG. 19 depicts a more detailed description of the control process of FIG. 10 with respect to, for example, the system of FIG. 18 according to certain aspects of this disclosure.
Figure 20:
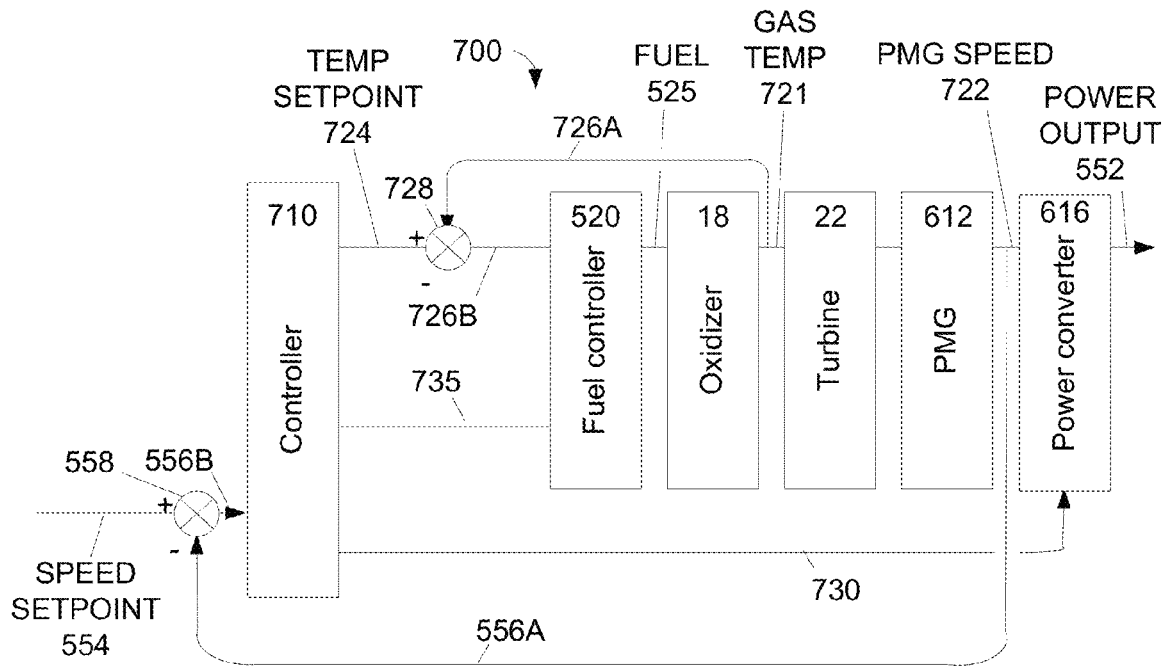
FIG. 20 depicts an exemplary speed and temperature control loop adapted for the process of, for example, FIG. 19 according to certain aspects of this disclosure.

FIG. 19 depicts a more detailed description of the control process 200 of FIG. 10 with respect to the system 600 of FIG. 18 according to certain aspects of this disclosure. In particular, the step 225 of process 200 is expanded with respect to how this step is accomplished with a system 600 comprising a PMG 612 and power converter 616. The process 200 follows the steps 205-220 as shown in FIG. 10, then transitions to step 652 of FIG. 19 wherein the turbine speed is initially maintained using a fuel control feedback loop such as shown in FIG. 16. In step 654, a starting load is provided by the power converter 616 thereby stabilizing the speed of the PMG 612. In certain embodiments, approximately 10 kW of load is added. In step 656, the speed of the PMG 612 is controlled by varying the load provided by the power converter 616. The process moves to step 658 which controls both the amount of output power on line 622 and the speed of the PMG 612 by simultaneously varying the fuel flow and load provided by the power converter 616 using a two-input, two-output control feedback system 700 such as shown in FIG. 20. The process then proceeds as shown in FIG. 10 starting at step 230.

FIG. 20 depicts an exemplary speed and temperature control loop 700 adapted for the process of FIG. 19 according to certain aspects of this disclosure. This control loop is partially operational during step 656 of the process of FIG. 19 and fully operational during step 658. In step 656, the speed 722 of the PMG 612 is sensed and fed back as a signal 556A to a summing junction 558 where the feedback signal 556A is combined with a speed setpoint signal 554, producing a speed error signal 556B. A controller 710 accepts error signal 556B and provides a control signal 730 to the power converter 616 to vary the load provided by the power converter 616. The controller 710 also provides a temperature setpoint signal 724 that, in certain embodiments, is held constant during step 656. In certain embodiments, the gas temperature 721 at the inlet of the turbine is fed back as signal 726A to a summing junction 728 where it is combined with the temperature setpoint signal 724 to generate a temperature error signal 726B that is fed to the temperature controller 560. In certain embodiments, the controller 710 provides a control signal 735 to the fuel controller 520 that overrides the feedback error signal 726B and directly control the fuel flow 525 while executing step 656. In certain embodiments, the temperature controller 520 operates during step 656 to adjust the fuel flow 525 so as to maintain the gas temperature 721 at the setpoint 724. In certain embodiments, the controller 710 executes a pure integral control function to generate control signal 735 so as to bring the PMG speed 722 to the speed setpoint 724 while also achieving the starting load set in step 654.

In step 658, the controller 710 receives feedback signal 556A from the PMG speed 722, and adjusts both the temperature setpoint signal 724 and the load control signal 730 to the power converter 616. In certain embodiments, a control algorithm within controller 710 that provides the load control signal 730 is faster than the control algorithm that provides the temperature setpoint signal 724, such that the speed control provided by changes in the power converter 616 has a higher bandwidth than the speed control provided by changes in the fuel flow 525. In certain embodiments, the controller 710 continues to provide the load control signal 730 as the process 200 continues to step 245 and the flow of the fuel gas 52 of FIG. 2 is varied by the temperature controller 520 to maintain the turbine speed at S2 and the outlet temperature at T1. In certain embodiments, the functions of controller 710 and temperature controller 520 are accomplished by a single controller (not shown) that receives both the feedback signals 726A and 556A and controls the fuel flow 525 directly as well as providing the load control signal 730.

Figure 21:
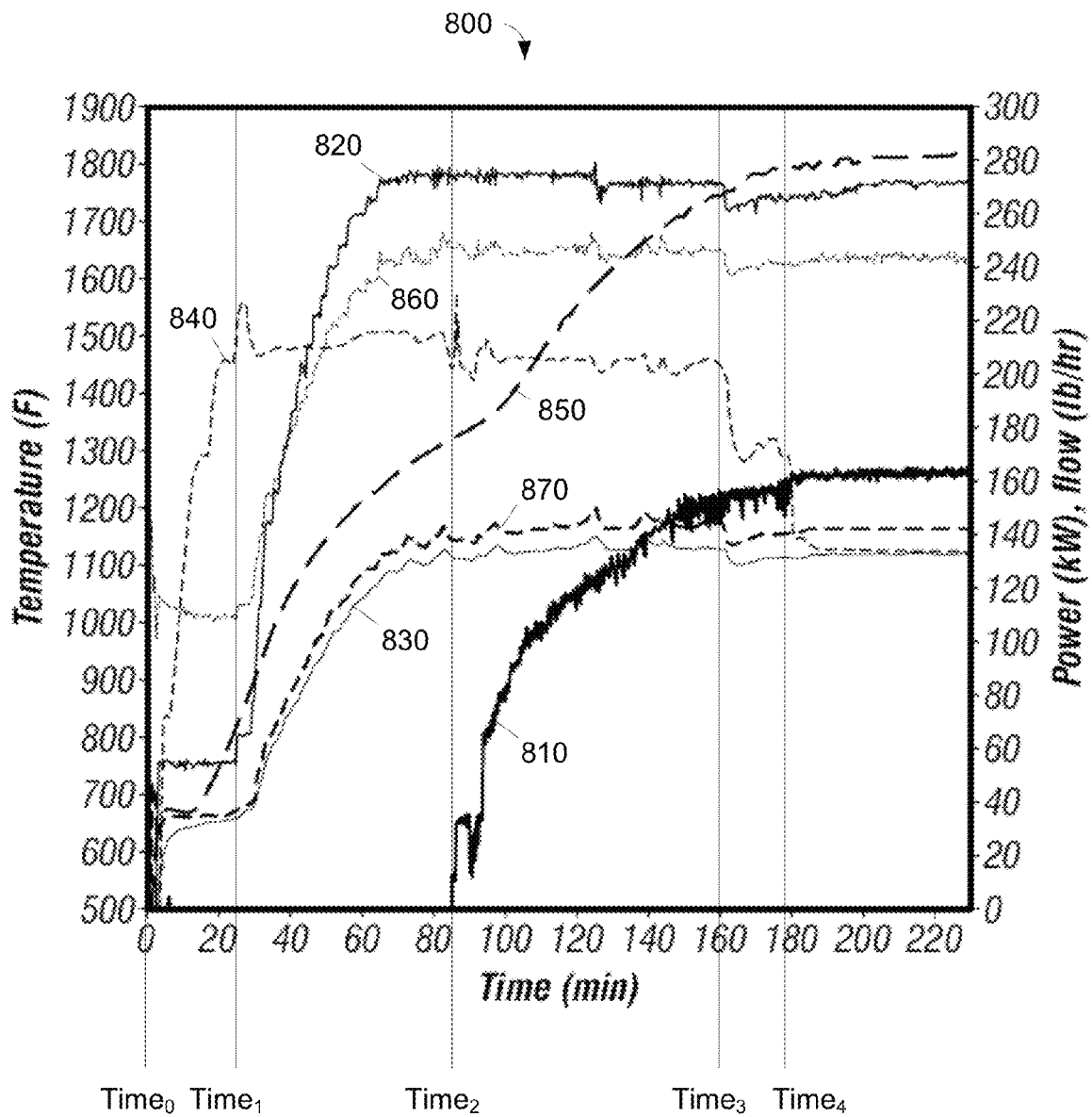
FIG. 21 is a plot of experimental data illustrating an exemplary start-up process of a multi-combustor turbine system according to certain aspects of this disclosure.

FIG. 21 is a plot 800 of data illustrating an exemplary start-up process of a multi-combustor turbine system 50 according to certain aspects of this disclosure. The plot presents the values over time of the commanded flow rate 810 of fuel gas 52, with reference to the system of FIG. 2, and the power generation 820 as well as the operating variables of warmer 62 inlet temperature (WIT) 830, warmer 62 outlet/oxidizer 60 inlet temperature (GIT) 840, oxidizer 60 exit/combustor 64 inlet temperature 850, combustor 64 outlet/turbine 66 inlet temperature 860, and turbine 66 outlet temperature 870.

The start-up process starts with the multi-combustor system 50 of FIG. 2 being completely off and at ambient temperature. These results will be described with reference to the system of FIG. 2 and the process flow 200 of FIG. 10. The plot 800 starts at Time=0 ($Time_0$) when the turbine combustor 64 is fired up to run on auxiliary fuel 54 in step 215. The flow 810 of the fuel gas 50 is zero and power generation 820 is zero. The temperatures 830, 840, 850, 860, and 870 of the various components rise to steady levels and power generation 820 begins at a first power level, for example at 50 kW. In certain embodiments, this is a load from the load module 420 of FIG. 14.

At $Time_1$, the warmer combustor 62 initially is operated using auxiliary fuel 54 as disclosed in step 230. The temperatures 830, 840, 860, and 870 of the various components again rise to higher steady levels and power generation 820 rises to a second power level, for example 270 kW. The temperature 850 of the oxidizer 60 outlet does not reach a steady state.

At $Time_2$, the flow 810 of fuel gas 50 of FIG. 2 is started as disclosed in step 235. The temperature 850 of the oxidizer 60 outlet continues to rise, inflecting upwards from its previous trajectory upon the initiation of the fuel gas flow 810. The power output 820 remains relatively constant as do the temperatures 830, 840, 860, and 870.

At $Time_3$, the temperature 850 of the oxidizer 60 outlet is nearing its target temperature and the auxiliary fuel 54 is turned off to the turbine combustor 64 as stated in step 240. As this directly affects the temperature of the gas reaching the turbine 22, the temperatures 860 and 870 of the gas at the turbine inlet and outlet, respectively, and the power output 820 dip suddenly as the turbine combustor 64 goes out. The temperature 840 at the oxidizer 60 inlet starts to drop while the fuel flow 810 rises slowly. The temperature 850 of the oxidizer 60 outlet continues to rise despite the drop in temperature 840, reflecting the large thermal mass and long time constant inherent in the design of oxidizer 60.

At $Time_4$, still part of step 240, the flow of auxiliary fuel 54 is cut off to the warmer 62 and the system 50 begins operation solely on fuel gas 50. The flow 810 of the fuel gas 50 continues to rise as the control loop acts to bring the temperature 850 of the oxidizer outlet to a target temperature, such as 1850° F. in the example of FIG. 21. The power output 820 also returns to its previous level as the temperature 860 of the turbine 22 inlet rises again. The temperature 840 of the oxidizer 60 inlet drops again, reflecting the loss of heat from the warmer 62. As the heat is now being provided in the oxidizer 60, the temperature 850 of the oxidizer 60 outlet remains at the target temperature despite the drop of over 300° F. in the temperature 840 of the oxidizer 60 inlet. This mode of operation is an example steady-state operating condition of the multi-combustor turbine system 50 disclosed herein. In certain embodiments that include a WRSG 412 of FIG. 14, this steady-state operation is maintained by the control loop of FIG. 17. In certain embodiments that include a PMG 612 of FIG. 18, this steady-state operation is maintained by the control loop of FIG. 20.

The concepts disclosed herein provide a system and method of gradually oxidizing at least a portion of a fluid that includes an oxidizable fuel. This system uses a turbine to drive a compressor that compresses the fluid that comprises the fuel that is then heated in an oxidizer wherein the heated compressed fluid is then used to drive the turbine. In certain embodiments, this system also includes a power generator. The system is adapted to provide a self-sustaining oxidation process within an oxidizer having an incoming fluid flow that comprises a fuel content of less than about 5% fuel (e.g. methane) that will not support a stable combustion flame. The disclosed systems include one or both of a turbine combustor and a warmer combustor used during the start-up process to bring the oxidizer up to the self-ignition temperature of the fuel. Once the oxidizer reaches a temperature that is at or near the self-ignition temperature of the fuel, one or both of the turbine combustor and the warmer combustor may be shut off. The system regulates the amount of fuel introduced into the fluid flow so as to control the temperature of the gas exiting the oxidizer and the load placed on the turbine by a power generator so as to control the turbine speed.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Headings and subheadings, if any, are used for convenience only and do not limit the disclosure.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology.

A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for gradually oxidizing fuel, comprising:
   an oxidizer having a reaction chamber with an inlet and an outlet, the reaction chamber configured to receive a gas comprising an oxidizable fuel through the inlet, the oxidizer configured to maintain a flameless oxidation process;
   a first heating chamber with an inlet and an outlet, the inlet of the first heating chamber in fluid communication with the outlet of the reaction chamber, the first heating chamber configured to receive the gas from the reaction chamber and to heat the gas;
   a turbine having an inlet and an outlet, the inlet of the turbine coupled to the outlet of the first heating chamber and configured to receive the gas from the first heating chamber;
   a compressor coupled to the inlet of the reaction chamber to compress the gas prior to the gas being received by the reaction chamber;
   a second heating chamber coupled between the compressor and the inlet of the reaction chamber, the second heating chamber being configured to receive the compressed gas from the compressor and to heat the gas prior to the gas being received by the reaction chamber; and
   a heat exchanger having a first portion coupled between the compressor and the second heating chamber such that the gas from the compressor passes through the first portion before the gas is received by the second heating chamber, and a second portion coupled to the outlet of the turbine such that the gas from the turbine passes through the second portion, the heat exchanger configured to thermally couple the gas in the second portion to the gas in the first portion.

2. The system of claim 1, wherein the oxidizer further comprises a porous media disposed within the reaction chamber.

3. The system of claim 1, wherein the oxidizer further comprises at least one anchor heater that is at least partially disposed within the reaction chamber.

4. The system of claim 1, wherein the oxidizer does not comprise a catalyst for the oxidation process.

5. The system of claim 1, wherein the oxidizer is further configured to maintain the oxidation process when the fuel content of the gas is below a level that will sustain a continuous flame.

6. The system of claim 5, wherein the oxidizer is further configured to maintain the oxidation process when the gas comprises less than 5% oxidizable fuel.

7. The system of claim 6, wherein the oxidizer is further configured to maintain the oxidation process when the oxidizable fuel is methane.

8. The system of claim 1, wherein the first heating chamber comprises a burner configured to ignite a combustible fuel-air mixture.

9. The system of claim 1, wherein the second heating chamber comprises a burner configured to ignite a combustible fuel-air mixture.

10. The system of claim 1, further comprising a power generator coupled to the turbine, the power generator configured to be driven by the turbine.

11. The system of claim 1, wherein:
    the gas comprises at least one volatile organic compound (VOC); and
    the oxidizer achieves at least partial oxidation of the VOC.

12. A gradual oxidation system comprising:
    a compressor configured to receive and compress a gas comprising a fuel-air mixture;
    a warmer coupled to the compressor, the warmer configured to receive the gas from the compressor and to heat the gas;
    a reaction chamber coupled to the warmer, the reaction chamber configured to receive the gas from the warmer and maintain a flameless oxidation process of the fuel-air mixture without a catalyst;
    a heater coupled to the reaction chamber, the heater configured to receive the gas from the reaction chamber and heat the gas;
    a turbine coupled to the heater and the compressor, the turbine being configured to receive the gas from the heater and expand the gas; and
    a controller coupled to the warmer and the heater, the controller configured to control the heating of the gas in the warmer and in the heater, wherein the controller is coupled to a sensor that measures a temperature of the gas at the outlet of the reaction chamber, the controller further configured to direct the warmer to heat the gas until the temperature reaches a setpoint.

13. The system of claim 12, further comprising a power generator coupled to the turbine and the controller, wherein the turbine is configured to drive the power generator and the controller is configured to control the power generator to maintain the turbine speed within a determined range.

14. A system for gradually oxidizing fuel, comprising:
    an oxidizer having a reaction chamber with an inlet and an outlet, the reaction chamber configured to receive a gas comprising an oxidizable fuel through the inlet of the reaction chamber, the oxidizer configured to maintain a flameless oxidation process, wherein the oxidizer further comprises at least one anchor heater that is at least partially disposed within the reaction chamber; and
    a heating chamber with an inlet and an outlet, the inlet of the heating chamber in fluid communication with the outlet of the reaction chamber, the heating chamber configured to receive the gas from the reaction chamber and to heat the gas.

15. The system of claim 14, wherein the heating chamber comprises a burner configured to ignite a combustible fuel-air mixture.

16. The system of claim 14, wherein the oxidizer further comprises a porous media disposed within the reaction chamber.

17. The system of claim 14, wherein the oxidizer does not comprise a catalyst for the oxidation process.

18. The system of claim 14, wherein the oxidizer is further configured to maintain the oxidation process when the fuel content of the gas is below a level that will sustain a continuous flame.

19. The system of claim 14, wherein:
the gas comprises at least one volatile organic compound (VOC); and
the oxidizer achieves at least partial oxidation of the VOC.

20. A system for gradually oxidizing fuel, comprising:
a heating chamber with an inlet and an outlet, the heating chamber configured to receive and heat a gas comprising an oxidizable fuel; and
an oxidizer having a reaction chamber with an inlet and an outlet, the inlet of the reaction chamber in fluid communication with the outlet of the heating chamber, the reaction chamber configured to receive the gas from the heating chamber, the oxidizer configured to maintain a flameless oxidation process, wherein the oxidizer further comprises at least one anchor heater that is at least partially disposed within the reaction chamber.

21. The system of claim 20, wherein the heating chamber comprises a burner configured to ignite a combustible fuel-air mixture.

22. The system of claim 20, wherein the oxidizer further comprises a porous media disposed within the reaction chamber.

23. The system of claim 20, wherein the oxidizer does not comprise a catalyst for the oxidation process.

24. The system of claim 20, wherein the oxidizer is further configured to maintain the oxidation process when the fuel content of the gas is below a level that will sustain a continuous flame.

25. The system of claim 20, wherein:
the gas comprises at least one volatile organic compound (VOC); and
the oxidizer achieves at least partial oxidation of the VOC.

26. A gradual oxidation system comprising:
a compressor configured to receive and compress a gas comprising a fuel-air mixture;
a warmer coupled to the compressor, the warmer configured to receive the gas from the compressor and to heat the gas;
a reaction chamber coupled to the warmer, the reaction chamber configured to receive the gas from the warmer and maintain a flameless oxidation process of the fuel-air mixture without a catalyst;
a heater coupled to the reaction chamber, the heater configured to receive the gas from the reaction chamber and heat the gas;
a turbine coupled to the heater and the compressor, the turbine being configured to receive the gas from the heater and expand the gas; and
a controller coupled to the warmer and the heater, the controller configured to control the heating of the gas in the warmer and in the heater, wherein the controller is coupled to a sensor that measures a temperature of the gas at the inlet of the turbine, the controller further configured to direct the heater to heat the gas until the temperature reaches a setpoint.

27. The system of claim 26, further comprising a power generator coupled to the turbine and the controller, wherein the turbine is configured to drive the power generator and the controller is configured to control the power generator to maintain the turbine speed within a determined range.

* * * * *